(12) United States Patent
Wang et al.

(10) Patent No.: US 11,632,497 B2
(45) Date of Patent: *Apr. 18, 2023

(54) SYSTEMS AND METHODS FOR CONTROLLING AN IMAGE CAPTURED BY AN IMAGING DEVICE

(71) Applicant: SZ DJI TECHNOLOGY CO., LTD., Shenzhen (CN)

(72) Inventors: Mingxi Wang, Shenzhen (CN); Hanping Chen, Shenzhen (CN); Jiadi Wang, Shenzhen (CN); Qi Zhou, Shenzhen (CN); Chao Weng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 272 days.

This patent is subject to a terminal disclaimer.

(21) Appl. No.: 17/151,439

(22) Filed: Jan. 18, 2021

(65) Prior Publication Data

US 2021/0144292 A1 May 13, 2021

Related U.S. Application Data

(63) Continuation of application No. 16/391,610, filed on Apr. 23, 2019, now Pat. No. 10,897,567, which is a (Continued)

(51) Int. Cl.
*H04N 5/232* (2006.01)
*G06F 3/048* (2013.01)
(Continued)

(52) U.S. Cl.
CPC ..... *H04N 5/23216* (2013.01); *G06F 3/04842* (2013.01); *G06F 3/04845* (2013.01); (Continued)

(58) Field of Classification Search
None
See application file for complete search history.

(56) References Cited

U.S. PATENT DOCUMENTS 9,164,506 B1   10/2015  Zang
2014/0008496 A1  1/2014  Lu et al.
(Continued)

FOREIGN PATENT DOCUMENTS

CN   102809969 A   12/2012
CN   105283816 A    1/2016
(Continued)

OTHER PUBLICATIONS

World Intellectual Property Organization (WIPO) International Search Report and Written Opinion for PCT/CN2016/103123 dated Jul. 14, 2017 7 Pages.

*Primary Examiner* — Patricia I Young
(74) *Attorney, Agent, or Firm* — Anova Law Group, PLLC

(57) ABSTRACT

A control device includes a touchscreen and one or more processors. The touchscreen is configured to display an image captured by an imaging device supported by a movable object or a carrier coupled to the movable object, and receive a user input indicative of selection of a position on the touchscreen to display a selected target of the image and selection of a zoom factor for zooming in or out of the selected target. The one or more processors are configured to generate control data based on information about the user input. The control data includes instructions for the imaging device, the carrier, or the movable object to automatically control an attitude of the imaging device for positioning the selected target at or near the selected position on the touchscreen and a zoom level of the imaging device according to the user selected zoom factor.

20 Claims, 11 Drawing Sheets

Related U.S. Application Data continuation of application No. PCT/CN2016/103123, filed on Oct. 24, 2016.

(51) Int. Cl.
*G06F 3/04842* (2022.01)
*G06F 3/04845* (2022.01)
*B64C 39/02* (2023.01)

(52) U.S. Cl.
CPC ..... *H04N 5/23203* (2013.01); *H04N 5/23296* (2013.01); *H04N 5/23299* (2018.08); *B64C 39/024* (2013.01); *B64C 2201/127* (2013.01)

(56) References Cited

U.S. PATENT DOCUMENTS

| | | |
|---|---|---|
| 2014/0146125 A1 | 5/2014 | Kristiansen et al. |
| 2015/0142213 A1 | 5/2015 | Wang et al. |

FOREIGN PATENT DOCUMENTS

| | | |
|---|---|---|
| CN | 105391939 A | 3/2016 |
| CN | 105512643 A | 4/2016 |
| CN | 105518555 A | 4/2016 |
| CN | 105518555 B | 11/2017 |
| JP | H08237533 A | 9/1996 |
| JP | 2003092750 A | 3/2003 |
| JP | 2013114324 A | 6/2013 |
| JP | 2015130612 A | 7/2015 |
| WO | 2014200604 A2 | 12/2014 |
| WO | 2016015251 A1 | 2/2016 |

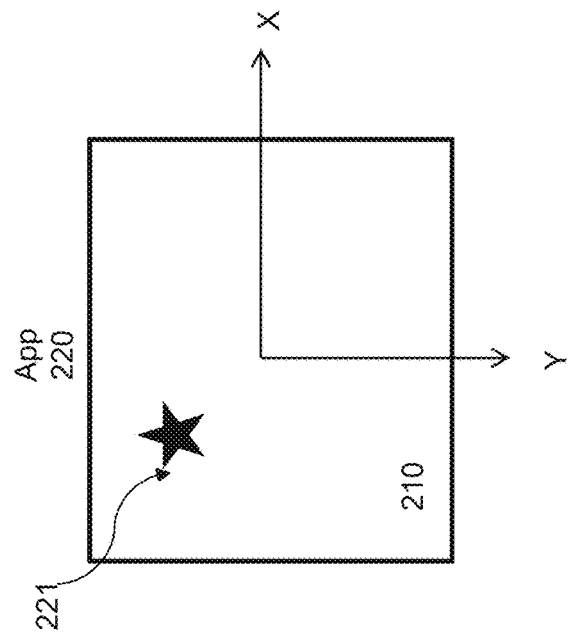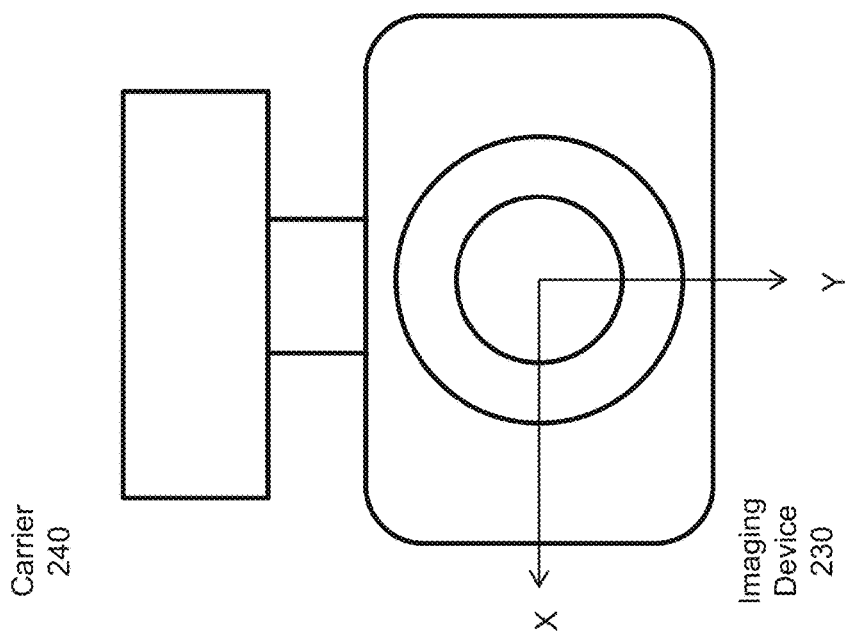
FIG. 2

SYSTEMS AND METHODS FOR CONTROLLING AN IMAGE CAPTURED BY AN IMAGING DEVICE

CROSS-REFERENCE TO RELATED APPLICATIONS

This application is a continuation of application Ser. No. 16/391,610, filed on Apr. 23, 2019, which is a continuation of International Application No. PCT/CN2016/103123, filed on Oct. 24, 2016, the entire contents of both of which are incorporated herein by reference.

BACKGROUND OF THE DISCLOSURE

Aerial vehicles, such as unmanned aerial vehicles (UAVs), can be used for performing aerial photography, surveillance, reconnaissance, and exploration tasks. Such aerial vehicles may carry an imaging device for capturing images of surrounding environment. The imaging device may be supported on the aerial vehicle with aid of a carrier that may allow the imaging device to rotate about one or more axes relative to the aerial vehicle.

For traditional UAVs, a control of a movement of the carrier and a control of a zoom function of the imaging device are provided as separate independent controls. This requires the user to provide two separate inputs to adjust an attitude and a zoom of the imaging device.

SUMMARY OF THE DISCLOSURE

A need exists for improved devices, systems or methods for controlling an image captured by an imaging device. A further need exists for allowing control of the image by controlling a zoom function and an orientation of an imaging device carried by a UAV. A control device may be configured to allow a user to visualize a target at a desired magnification and position in an image displayed remotely from an UAV with simplified user operations.

Systems and methods are provided for controlling an image captured by an imaging device carried by a UAV. Devices may be provided to show the image on a display, where the image is captured by the imaging device carried by the UAV. The UAV, imaging device, and/or a carrier supporting the imaging device may be configured to receive information about a user input indicative of an object of interest within the image. The user input may be a single user action such as a tap on the object of interest shown on the display. In response to the information, an orientation and/or position of the UAV, carrier and one or more parameters of the imaging device (e.g., zooming) may be adjusted so that the object of interest is displayed to user at the desired magnification and position with respect to the image or view.

According to an aspect of the disclosure, a control device is provided. The control device may comprise: a display configured to show an image captured by an imaging device supported by a movable object; and one or more processors configured to: (1) obtain information about a user input indicative of a target shown within the image, and (2) generate data, based on the information about the user input indicative of the target, to effectuate an automatic control of (a) a zoom level of the imaging device and (b) an attitude of the imaging device relative to the target.

In some embodiments, the display utilized in the control device is a touchscreen. The user input is a touch of a region of the display. In some cases, the region of the display shows the target. In some embodiments, the user input indicative of the target is provided by a single user action. In some embodiments, the information about the user input comprises a location within the display where the target is shown. In some embodiments, the display further shows one or more zoom controls for controlling the zoom level of the imaging device. In some cases, the one or more zoom controls comprises (i) a zoom-in control configured to increase the zoom level of the imaging device and (ii) a zoom-out control configured to decrease the zoom level of the imaging device. In some cases, the one or more zoom controls comprises a default zoom control for setting the zoom level of the imaging device to a pre-set zoom level. The pre-set level may be configurable by a user.

In some embodiments, the display utilized in the control device further shows a menu through which a user selects a predetermined factor by which to automatically adjust the size of the target shown within the image.

In some embodiments, the data to effectuate the automatic control of (a) and (b) comprises instructions to at least one of the imaging device, a carrier supporting the imaging device, or the movable object for the automatic control of (a) and (b). In some embodiments, the data to effectuate the automatic control of (a) and (b) comprises coordinates within the display that shows the target, to be transmitted to the imaging device, a carrier supporting the imaging device, or the movable object. In some cases, the coordinates are used to generate control commands for one or more actuators of the carrier and/or the movable object. In some embodiments, the data to effectuate the automatic control of (a) and (b) comprises a predetermined factor by which to automatically adjust the zoom level of the imaging device, to be transmitted to the imaging device, a carrier supporting the imaging device, or the movable object.

In some embodiments, the zoom level of the imaging device is automatically controlled by automatically adjusting the zoom level of the imaging device by a predetermined factor. In some cases, the zoom level of the imaging device is automatically adjusted to effect a zoom-in. In some embodiments, the attitude of the imaging device relative to the target is automatically adjusted by adjusting an attitude of the imaging device relative to the movable object, an attitude of the movable object relative to the target, or both the attitude of the imaging device and the attitude of the movable object. In some embodiments, the attitude of the imaging device relative to the target is automatically controlled so as to cause the target to be displayed at or near a predetermined location within the display. In some embodiments, the data effectuate the automatic control of (a) and (b) substantially concurrently.

In some embodiments, the control device further comprises a communication unit configured to communicate with at least one of the imaging device, a carrier supporting the imaging device, or the movable object. In some cases, the communication unit is configured to wireless transmit the data to effectuate the automatic control of (a) and (b). The imaging device is movable relative to the movable object. For example, the imaging device is supported by the movable object with aid of a carrier, and the carrier permits the imaging device to rotate relative to the movable object about at least two axes. In some embodiments, the movable object is an unmanned aerial vehicle (UAV).

Additional aspects of the disclosure may provide a non-transitory computer readable medium comprising program instructions for capturing an image. The non-transitory computer readable medium may comprise: program instructions for showing, on a display, the image captured by an imaging device supported by a movable object; program instructions for obtaining information about a user input indicative of a target shown within the image; and program instructions for generating data, based on the information about the user input indicative of the target, to effectuate automatic control of (a) a zoom level of the imaging device and (b) an attitude of the imaging device relative to the target.

According to another aspect, a method of capturing an image is provided. The method comprises: showing, on a display, the image captured by an imaging device supported by a movable object; obtaining information about a user input indicative of a target shown within the image; and generating data, based on the information about the user input indicative of the target, to effectuate automatic control of (a) a zoom level of the imaging device and (b) an attitude of the imaging device relative to the target.

In another aspect, a control device is provided. The control device comprises: a display configured to show an image captured by an imaging device supported by a movable object; one or more processors configured to: (1) obtain information about a user input indicative of a target shown within the image, and (2) generate data, based on the information about the user input indicative of the target, to effectuate an automatic control of (a) a size of the target shown on the display and (b) a position of the target shown on the display.

In some embodiments, the display utilized in the control device is a touchscreen. The user input is a touch of a region of the display. In some cases, the region of the display shows the target. In some embodiments, the user input indicative of the target is provided by a single user action. In some embodiments, the information about the user input comprises a location within the display where the target is shown. In some embodiments, the display further shows one or more zoom controls for controlling the zoom level of the imaging device. In some cases, the one or more zoom controls comprises (i) a zoom-in control configured to increase the zoom level of the imaging device and (ii) a zoom-out control configured to decrease the zoom level of the imaging device. In some cases, the one or more zoom controls comprises a default zoom control for setting the zoom level of the imaging device to a pre-set zoom level. The pre-set level may be configurable by a user.

In some embodiments, the display utilized in the control device further shows a menu through which a user selects a predetermined factor by which to automatically adjust the size of the target shown within the image.

In some embodiments, the data to effectuate the automatic control of (a) and (b) comprises instructions to at least one of the imaging device, a carrier supporting the imaging device, or the movable object for the automatic control of (a) and (b). In some embodiments, the data to effectuate the automatic control of (a) and (b) comprises coordinates within the display that shows the target, to be transmitted to the imaging device, a carrier supporting the imaging device, or the movable object. In some cases, the coordinates are used to generate control commands for one or more actuators of the carrier and/or the movable object. In some embodiments, the data to effectuate the automatic control of (a) and (b) comprises a predetermined factor by which to automatically adjust the zoom level of the imaging device, to be transmitted to the imaging device, a carrier supporting the imaging device, or the movable object.

In some embodiments, the zoom level of the imaging device is automatically controlled by automatically adjusting the zoom level of the imaging device by a predetermined factor. In some cases, the zoom level of the imaging device is automatically adjusted to effect a zoom-in. In some embodiments, the attitude of the imaging device relative to the target is automatically adjusted by adjusting an attitude of the imaging device relative to the movable object, an attitude of the movable object relative to the target, or both the attitude of the imaging device and the attitude of the movable object. In some embodiments, the attitude of the imaging device relative to the target is automatically controlled so as to cause the target to be displayed at or near a predetermined location within the display. In some embodiments, the data effectuate the automatic control of (a) and (b) substantially concurrently.

In some embodiments, the control device further comprises a communication unit configured to communicate with at least one of the imaging device, a carrier supporting the imaging device, or the movable object. In some cases, the communication unit is configured to wireless transmit the data to effectuate the automatic control of (a) and (b). The imaging device is movable relative to the movable object. For example, the imaging device is supported by the movable object with aid of a carrier, and the carrier permits the imaging device to rotate relative to the movable object about at least two axes. In some embodiments, the movable object is an unmanned aerial vehicle (UAV).

In a separate yet related aspect, a non-transitory computer readable medium comprising program instructions for capturing an image is provided. The non-transitory computer readable medium comprises: program instructions for showing, on a display, the image captured by an imaging device supported by a movable object; program instructions for obtaining information about a user input indicative of a target shown within the image; and program instructions for generating data, based on the information about the user input indicative of the target, to effectuate an automatic control of (a) a size of the target shown on the display and (b) a position of the target shown on the display.

In another related aspect, a method of capturing an image is provided. The method comprises: showing, on a display, the image captured by an imaging device supported by a movable object; obtaining information about a user input indicative of a target shown within the image; and generating data, based on the information about the user input indicative of the target, to effectuate an automatic control of (a) a size of the target shown on the display and (b) a position of the target shown on the display.

According to another aspect of the disclosure, a control device is provided. The control device comprises: a display configured to show one or more images captured by an imaging device supported by movable object; and one or more processors configured to: (1) obtain information about a single user input indicative of adjusting a zoom level of an image shown on the display to a pre-set zoom level or by a predetermined zoom factor, and (2) generate instructions, based on the single user input, to effectuate an automatic adjustment of (a) a zoom level of the imaging device, (b) a distance of the imaging device from a target shown in the image, or (c) both the zoom level and the distance of the imaging device, such that (i) the image shown on the display is at the pre-set zoom level, or (ii) the zoom level of the image shown on the display is adjusted by the predetermined zoom factor.

In some embodiments, the pre-set zoom level is a 1× optical zoom. In some embodiments, the pre-set zoom level is an original zoom level at which the imaging device starts capturing images. In some embodiments, the zoom level of the image is automatically adjusted to the pre-set zoom level at a fastest speed at which (1) the imaging device is capable of zooming, (2) the distance of the imaging device from the target is capable of changing, or the combination of (1) and (2). In some embodiments, the single user input is a touch of a predetermined region of the display. In some embodiments, the predetermined region of the display shows a default zoom control that causes the image to zoom to the pre-set zoom level.

In some embodiments, the display further shows a menu through which a user selects the zoom factor. In some cases, the menu becomes visible when the user touches the display for a period of time for longer than threshold length of time. Alternatively, the menu becomes visible when the user touches the display with a pressure higher than a threshold pressure. The menu may show a plurality of options for the zoom factor, and the user capable of selecting an option from the plurality of options.

In some embodiments, the display utilized in the control device is a touchscreen. The display further shows one or more zoom controls for the user to control zooming in or zooming out of the image. For example, the one or more zoom controls may comprise (i) a zoom-in region of the display that causes the image to zoom in while the user contacts the zoom-in region and (ii) a zoom-out region of the display that causes the image to zoom out while the user contacts the zoom-out region.

In some embodiments, the instructions to effectuate the automatic adjustment of (a), (b), or (c) comprises instructions to at least one of the imaging device, a carrier supporting the imaging device, or the movable object for the automatic adjustment of (a), (b), or (c). In some embodiments, the zoom level of the image is automatically adjusted by automatically adjusting the zoom level of the imaging device. In some embodiments, the control device further comprises a communication unit configured to communicate with at least one of the imaging device, a carrier supporting the imaging device, or the movable object. In some cases, the communication unit is configured to wirelessly transmit the instructions. The imaging device is movable relative to the movable object. For example, the imaging device is supported by the movable object with aid of a carrier, and the carrier permits the imaging device to rotate relative to the movable object about at least two axes. In some embodiments, the movable object is an unmanned aerial vehicle (UAV).

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 2 illustrates examples of using the information about a target to control an attitude of the imaging device, in accordance with embodiments of the disclosure.

DETAILED DESCRIPTION OF THE EMBODIMENTS

Figure 1:
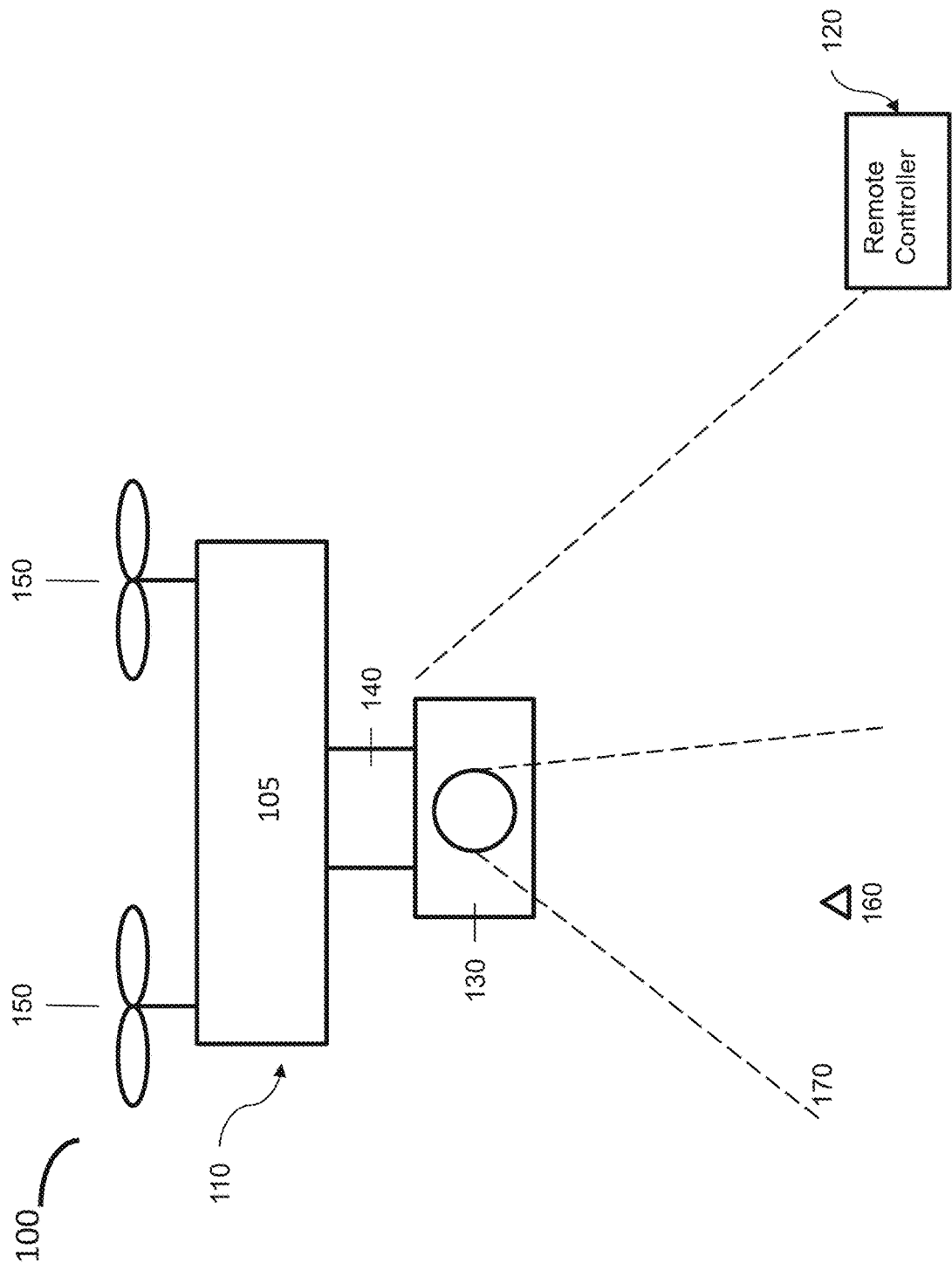
FIG. 1 illustrates an exemplary system including a remote controller, in accordance with embodiments of the disclosure.

While some embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

The disclosure provides systems and methods for controlling an image captured by an imaging device supported by a movable object. Various aspects of the disclosure described herein may be applied to any of the particular applications set forth below. The disclosure may be applied with an unmanned aerial vehicle (UAV), or as part of an aerial photography system. It shall be understood that different aspects of the disclosure can be appreciated individually, collectively or in combination with each other.

Using the systems and methods provided herein, a user can control an image shown on a display. The image may be captured using an imaging device supported by a UAV. A target may be shown on the display, and the image may be controlled so that the target is shown at a desired magnification and position with simplified user operations. A user input may be a single user action such as a tap on the target shown on the display. In some embodiments, the systems and methods may allow a user to perform a single action that controls a zoom level of an image shown on the display and position of a target at or near a center of the display. A user may perform a single action indicative of adjusting a zoom level of an image shown on the display to a pre-set zoom level or by a predetermined zoom factor. In response to the information about the user input, an orientation and/or position of the UAV, a carrier supporting the imaging device and one or more parameters of the imaging device (e.g., zoom level) may be adjusted so that the target is displayed to user at the desired magnification/size and/or position with respect to the image or the display.

The systems and methods provided herein may advantageously allow a user to control, with a single user action, multiple imaging factors that traditionally required multiple inputs. For instance, traditionally, separate user controls are provided for zooming an image, and for adjusting a position of a target within an image. This can take time and be cumbersome, while the UAV is flying around. Traditional controls do not allow a zoom and position to be controlled simultaneously. Additionally, if a user first zooms in, the target may escape the field of view easily with movement of the UAV and/or carrier supporting the imaging device. If a user first roughly centers a target and then zooms in, more time may be required, and sometimes additional adjustments of re-centering or positioning the target may occur, before performing further zoom functions. Allowing the zoom and position of the target in the image to be controlled together allows cooperation between the imaging device zoom and action of the UAV and/or carrier. Such simplified actions are useful when a user is controlling flight of the UAV and/or images captured by an imaging device, since it takes less of the user's attention to perform such functions. It also takes up less time, which is useful in a dynamic environment.

FIG. 1 illustrates an exemplary image control system 100 comprising an imaging device 130 and a remote controller 120, in accordance with embodiments of the disclosure. The imaging device is supported by a movable object 110. The imaging device may be directly supported by the movable object, or may be supported by the movable object via a carrier 140. The imaging device may be used to capture image data within a field of view 170 of the imaging device. One or more targets 160 may be within the field of view of the imaging device. Although the movable object 110 is depicted as a UAV, this depiction is not intended to be limiting, and any suitable type of movable object can be used, as described herein.

The movable object 110 may be any object capable of traversing an environment. The movable object may be capable of traversing air, water, land, and/or space. The environment may include objects that are incapable of motion (stationary objects) and objects that are capable of motion. Examples of stationary objects may include geographic features, plants, landmarks, buildings, monolithic structures, or any fixed structures. Examples of objects that are capable of motion include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object 110 may be a vehicle. The vehicle may be a self-propelled vehicle. The vehicle may traverse an environment with aid of one or more propulsion units. The vehicle may be an aerial vehicle, a land-based vehicle, a water-based vehicle, or a space-based vehicle. The vehicle may be an unmanned vehicle. The vehicle may be capable of traversing an environment without a human passenger onboard. Alternatively, the vehicle may carry a human passenger. In some embodiments, the movable object may be an unmanned aerial vehicle (UAV).

Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units 150 that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body 105 with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a flight controller, one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The one or more sensors may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors). The housing may have a single cavity or multiple cavities. In some instances, a flight controller may in communication with one or more propulsion units and/or may control operation of the one or more propulsion units. The flight controller may communicate and/or control operation of the one or more propulsion units with aid of one or more electronic speed control (ESC) modules. The flight controller may communicate with the ESC modules to control operation of the propulsion units.

In some embodiments, the movable object may be configured to support a payload using a carrier 140. The payload may include one or more imaging devices 130. The carrier may permit the payload to move relative to the movable object. For instance, the carrier may permit the payload to rotate about one, two, three or more rotational axes. In another instance, the carrier may permit the payload to move linearly along one, two, three, or more axes. The axes for the rotational or translational movement may or may not be orthogonal to each other. The relative movement can be a translation with respect to one or more degrees of freedom (e.g., along one, two, or three axes) and/or a rotation with respect to one or more degrees of freedom (e.g., about one, two, or three axes), or any suitable combination thereof. The one, two, or three axes may be any combination of a pitch axis, yaw axis, or a roll axis. The carrier may include a one-axis gimbal, two-axis gimbal, or three-axis gimbal.

The carrier may comprise one, two, three or more frame components. A first frame component may be used to support a payload. The first frame component may bear weight of the payload. The payload may be stationary relative to the first frame component, or may rotate about one or more axes relative to the first frame component. Optionally, a second frame component may support a first frame component and the payload. The second frame component may bear weight of the first frame component and the payload. The first frame component may rotate about an axis relative to the second frame component. Optionally, a third frame component may support a second frame component, a first frame component and the payload. The third frame component may bear weight of the second frame component, the first frame component and the payload. The second frame component may rotate about an axis relative to the third frame component. The third frame component may be supported by the movable object. Optionally, the third frame component may be supported by a vibration absorption device. The vibration absorption device may comprise one or more shock absorbers. The shock absorbers may dampen vibrations along one or more axes. The third frame component may be stationary relative to the movable object and/or vibration absorption device. Alternatively, the third frame component may rotate about an axis relative to the movable object and/or vibration absorption device.

The carrier may comprise, one, two, three, four, or more actuators. The actuators may be motors. The actuators may control motion of one or more frame components relative to one another, and/or relative to the payload or the movable object. The motors may receive one or more control signals from a remote controller, the payload, and/or the movable object that may control motions of the motors, and thereby control disposition of the one or more frame components. Controlling disposition of one or more frame components may control the posture of the payload relative to the movable object. Controlling posture of the payload relative to the movable object may comprise varying and/or maintaining the posture of the payload relative to the movable object. The posture of the payload relative to the movable object may be controlled (e.g., varied or maintained) about one, two, or three axes.

In some embodiments, one or more sensors may be provided on the movable object, the carrier, and/or the payload. The sensors may be provided on one, two, three or more frame components of the carrier. The sensors may be provided on one, two, three or more actuators of the carrier and/or may be a part of the actuators. The sensors may be useful for determining an attitude, angular velocity, and/or angular acceleration about one, two, or three axes, and/or a location, linear velocity, and/or linear acceleration with respect to one, two, or three axes. The sensors may be inertial sensors.

A payload may optionally be supported by a movable object without aid of a carrier. The payload may or may not be movable relative to the movable object without aid of a carrier. The payload may rotate about one, two or three axes without aid of a carrier. In some embodiments, the payload may have a fixed position and/or posture relative to the movable object. The movable object may or may not move to adjust an attitude of the payload relative to a target within a surrounding environment.

In some embodiments, the payload may comprise one or more imaging devices 130. An imaging device as described herein may serve as an image capture device. The imaging device can be used for capturing image data. In some embodiments, the imaging device may be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may capture color images, greyscale image, and the like. The imaging device may be an optical imaging device, an infrared imaging device, an ultraviolet imaging device, or a thermal imaging device. The imaging device may be able to image an environment by detecting various wavelengths of light (e.g., visible light, infrared, etc) in the environment.

An imaging device may include complementary metal oxide semiconductor (CMOS) sensors that generate electrical signals in response to wavelengths of light. The resulting electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor. The image sensor may employ a rolling shutter, where image rows or columns are read out and reset sequentially.

The imaging device 130 may be configured to captures images at a desired zoom level. In some embodiments, the imaging device may include zoom lens for which the focal length or angle of view can be varied. The imaging device may provide optical zoom by adjusting focal length of the zoom lens. For instance, one or more lenses may slide along an optical axis to adjust a focal length such that a designed zoom level or magnification level can be achieved. The focal length may be increased when zooming out, and the focal length may be decreased when zooming in. The focal length may be adjusted by moving the one or more lenses along the optical axis relative to an imaging sensor. The focal length may be adjusted by moving the imaging sensor along the optical axis relative to the one or more lenses. The focal length may be adjusted by moving both the imaging sensor and the one or more lenses such that a distance between imaging sensor and the lenses is adjusted. In some cases, one or more motors may be included for moving the one or more elements (e.g., lens, imaging sensor) to adjust the focal length. The imaging device may comprise one or more zoom motors that may adjust a relative distance between the imaging sensor and the one or more lenses, and/or adjust any other optical element that may affect the optical path of light captured by the imaging device to the imaging sensor.

In some embodiments, the imaging device may provide a digital zoom. For instance, captured images may be zoomed-in by cropping the image down to a centered area with the same aspect ratio as the original, and interpolating the result back up to the pixel dimensions of the original. In some embodiments, the imaging device may be configured to adjust a zoom level using optical zoom, digital zoom or a combination of both.

A variety of zoom level can be achieved using either the optical zoom, digital zoom or a combination of both. In some cases, a zoom level may refer to the zoom ratio between a current image and a base image. The base image may be the original image or the image captured when the image device is at default state (e.g., the focal length is maximum). In some cases, a zoom factor may be defined as the zoom ratio between the current image and a previous image (base image). The zoom level or zoom factor can be, for example, 1×, 1.5×, 1.8×, 2×, 3×, 4×, 7×, 24, 30×, 50×, 60×, 70×, 80, 90×, 120×, etc. An image resolution or image quality may or may not be lost at the maximum zoom level. In some cases, image deterioration may occur at certain zoom levels. In some cases, all the zoom levels or zoom factors can be achieved without image deterioration.

The digital zoom and optical zoom can be combined in various different ways. In some cases, a digital zoom and optical zoom may be performed concurrently. For instance, a digital zoom factor of 3× and an optical zoom factor of 4× may be performed simultaneously so as to reach a total zoom factor of 7×. In some cases, digital zoom can be performed prior to optical zoom. For example, a zoom level of an image may be increased to a desired a zoom level by digital zoom, then the digital zoom may be decreased while the optical zoom may be increased to replace the digital zoom effect.

A zoom level can be adjusted by adjusting a focal length of the imaging device. A focal length may refer to the distance from the center of the lens to a focal point of the lens. When an object is distant from the imaging device, the focal length approximates to the distance from the lens to the image. In some cases, the focal length may be adjusted by adjusting a distance between the one or more lenses and an image sensor such that a zoom level of the imaging device can be adjusted by varying the distance. A longer focal length may lead to higher magnification/zoom-in level of an image and a narrow field of view; conversely, shorter focal length may correspond to a lower magnification/zoom-in level and a wider field of view. In some cases, a ratio between focal lengths may correspond to a zoom factor or a zoom ratio. In an example, a focal length varied from 55 mm to 18 mm may correspond to a zoom factor or zoom ratio of 55/18≈3×. The relationship between the focal length and zoom factor may or may not be linear. In some cases, the focal length and zoom factor have a linear relationship when a distance between the imaging device and the object to be imaged is significant greater than the focal length. In some cases, the focal length and zoom factor may have a non-linear relationship.

A zooming speed may be determined based on the speed of the optical zoom, the digital zoom or a combination of both. A zooming speed may refer to the speed at which a zoom level of an image is perceived to be adjusted. A zooming speed may refer to the speed at which a size of a target is changing as shown on a display. The speed may be linear or nonlinear. The speed may be a constant or varied. The zooming speed may refer to an average speed during an adjustment of zoom level. The zooming speed may refer to an average speed at which adjustment by a zoom factor is achieved. For example, in some cases, when the zooming speed is an average speed, the zooming speed may be at least 1×/s, 2×/s, 4×/s, 10×/s, 20×/s, 30×/s, 40×/s, 50×/s, 60×/s, 70×/s, 80×/s, 100×/s, etc. In some embodiments, the speed of the optical zoom may depend on a speed at which a distance between a lens and an imaging sensor may be adjusted. The speed of the optical zoom may depend on how fast a focal length is adjusted. The speed at which the distance between a lens and the imaging sensor may be adjusted may depend on a speed of a zoom motor. In some embodiments, the speed of a digital zoom may be instantaneous or very quick. The speed of the digital zoom may be less than about 5 seconds, 3 seconds, 2 second, 1 second, 0.5 seconds, 0.1 seconds, 0.05 seconds, 0.01 seconds, 5 milliseconds, 1 millisecond, 0.5 milliseconds, or 0.1 milliseconds. The speed of the digital zoom may depend on one or more processors that may be processing image data. A zooming speed may also be determined based on a movement of the imaging device relative to the target. A speed of movement of the imaging device relative to the target may depend on a speed of a movable object, such as a UAV, relative to the target. This may depend on how quickly a UAV is able to fly. In some embodiments, environmental factors, such as wind, may affect how quickly the UAV is able to fly. The direction of movement of the imaging device relative to the target may also affect the zooming speed. For instance, if the movable object is traveling away from the target while the imaging device is zooming in, the movement of the movable object may partially offset the zooming in of the imaging device, and slow down the zoom-in speed. The zooming speed may be determined based on a combination of the zoom level (e.g., optical zoom, digital zoom, or combination of both) of the imaging device, and movement of the imaging device relative to the target.

In some cases, a zooming may be achieved by adjusting an optical zoom level or digital zoom level of the imaging device. In some cases, a zooming may be achieved by adjusting the zoom level of the imaging device as well as moving the imaging device closer to or farther away from the target. In some cases, a zooming may be achieved by moving the imaging device closer or farther from the target alone.

The imaging device may capture an image frame or a sequence of image frames at a specific image resolution. In some embodiments, the image frame resolution may be defined by the number of pixels in a frame. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution. Pixels of camera may be square. Other embodiments may take into account non-square pixels or other optical distortions.

The imaging device may capture a sequence of image frames at a specific capture rate. In some embodiments, the sequence of images may be captured at standard video frame rates (frame per second) such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds, 0.1 seconds, 0.2 seconds, 0.5 seconds, 1 second, 2 seconds, 5 seconds, or 10 seconds. In some embodiments, the capture rate may change depending on user input and/or external conditions (e.g. illumination brightness).

The image data captured by the image sensor can be stored in a data storage device. The data storage device may be based on semiconductor, magnetic, optical, or any suitable technologies and may include flash memory, USB drives, memory cards, solid-state drives (SSDs), hard disk drives (HDDs), floppy disks, optical disks, magnetic tapes, and the like. For example, the data storage device can include removable storage devices that are detachably couplable to an imaging device such as memory cards of any suitable formats such as PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, SxS, Universal Flash Storage (UFS), mini SD, microSD, xD-Picture Card, Intelligent Stick (iStick), Serial Flash Module (SFM), NT Card, XQD card, and the like. The data storage device can also include external hard disk drives, optical drives, tape drives, floppy drives, and other suitable storage devices that may be operatively connected to the imaging device.

The image data captured by the image sensor can be transmitted to the remote controller by an image transmission unit. In some embodiments, the image data may be compressed or otherwise processed before being transmitted by the image transmission unit. In other cases, the image data may not be compressed or processed before being transmitted. The transmitted image data may be displayed on the remote controller so that a user operating the control terminal can view the image data and/or interact with the control terminal based on the image data.

The image data captured by the image sensor can be pre-processed by a pre-processing unit. The pre-processing unit can include any hardware, software, or a combination thereof. Examples of pre-processing unit can include a field programmable gate array (FPGA). The pre-processing unit can be operatively coupled to the image sensor to preprocessing of the raw image data before the image data is processed to extract specific piece of information. Examples of tasks performed by the pre-processing unit can include re-sampling to assure the correctness of the image coordinate system, noise reduction, contrast enhancement, scale space representation, and the like.

The imaging device may transmit the image data to a remote controller. The data may be transmitted wirelessly with aid of a transmitter on-board the imaging device. The data may be transmitted to the remote controller using direct communications. Direct communications may be provided between the movable object/imaging device and the remote controller. The direct communications may occur without requiring any intermediary device or network. The data may be transmitted to the remote controller using indirect communications. Indirect communications may be provided between the movable object/imaging device and the remote controller. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof. Alternatively, the imaging device may provide image data to the movable object and/or the carrier. The image data may be provided via a wired or wireless connection. The movable object and/or carrier may in turn transmit the image data to the remote controller.

A target object 160 may be selected by a user. The target may be shown on the display within an image and selected by a user via user interaction with the display screen. The target may be a region or area of the image that a user may select for further scrutiny or tracking. The target may be an object within an environment. The target may be a region or portion of the environment. The target may or may not be visually distinguishable from its surroundings. The target may be a stationary target or a moving target. A stationary target may remain substantially stationary within an environment. Examples of stationary targets may include, but are not limited to landscape features (e.g., trees, plants, mountains, hills, rivers, streams, creeks, valleys, boulders, rocks, etc.) or manmade features (e.g., structures, buildings, roads, bridges, poles, fences, unmoving vehicles, signs, lights, etc.). Stationary targets may include large targets or small targets. In some instances, the stationary target may correspond to a selected portion of a structure or object. For example, the stationary target may correspond to a particular section (e.g., top floor) of a skyscraper. In various embodiments, the target 160 being imaged by the imaging device can include any natural or man-made objects or structures such geographical landscapes (e.g., mountains, vegetation, valleys, lakes, or rivers), buildings, vehicles (e.g., aircrafts, ships, cars, trucks, buses, vans, or motorcycle).

The target may be a moving target. A moving target may be capable of moving within the environment. The moving target may always be in motion, or may be at motions for portions of a time. The moving target may move in a fairly steady direction or may change direction. The moving target may move in the air, on land, underground, on or in the water, and/or in space. The moving target may be a living moving target (e.g., human, animal) or a non-living moving target (e.g., moving vehicle, moving machinery, object blowing in wind or carried by water, object carried by living target). The moving target may include a single moving object or a group of moving objects. For instance, the moving target may include a single human or a group of moving humans. Moving targets may be large targets or small targets. A user may select a moving target. A moving target may be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments.

A moving target may be capable of moving freely within the environment with respect to six degrees of freedom (e.g., three degrees of freedom in translation and three degrees of freedom in rotation). Alternatively, the movement of the moving target can be constrained with respect to one or more degrees of freedom, such as by a predetermined path, track, or orientation. The movement can be actuated by any suitable actuation mechanism, such as an engine or a motor. The actuation mechanism of the moving target can be powered by any suitable energy source, such as electrical energy, magnetic energy, solar energy, wind energy, gravitational energy, chemical energy, nuclear energy, or any suitable combination thereof. The moving target may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the moving target can be a vehicle, such as a remotely controlled vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The target can include live subjects such as people or animals. The target may be moving or stationary relative to any suitable reference frame. The reference frame can be a relatively fixed reference frame (e.g., the surrounding environment, or earth). Alternatively, the reference frame can be a moving reference frame (e.g., a moving vehicle). In various embodiments, the target may include a passive target or an active target. An active target may be configured to transmit information about the target, such as the target's GPS location, to the movable object. Information may be transmitted to the movable object via wireless communication from a communication unit of the active target to a communication unit of the movable object. Examples of an active target can include a friendly vehicle, building, troop, or the like. A passive target is not configured to transmit information about the target. Examples of a passive target can include a neutral or hostile vehicle, building, troop, and the like.

One or more targets may be shown within a field of view 170. In some cases, adjusting a location of a target displayed within an image or adjusting a zoom level may result in change of a field of view or angle of view. A field of view may be determined based on various characteristics of the imaging device and a relative position between the imaging device and a target to be imaged. For example, a lens focal length and image sensor size set up the fixed relationship between the field of view and the distance from the imaging device to the target. Field of view is the area of the view captured on the camera's image sensor. In some instances, the field of view 170 of the imaging device may be adjusted in response to the selection of the target. The orientation of the UAV and/or imaging device may be adjusted based on the target selected. For instance, the orientation of the UAV and/or imaging device may be selected to provide the target within a central region of the field of view of the imaging device. In examples, the target direction may be at a center point, or along a lateral and/or longitudinal central line of the field of view such that the target may be displayed at or near a center region of the image.

The system 100 may be configured to captures images of a stationary target. The UAV may or may not move relative to the stationary target while capturing the images. The imaging device may or may not be configured to move (optionally with aid of carrier) relative to the UAV while capturing the images.

The system 100 may be configured to capture images of a moving target. In some cases, the UAV may be configured to track the moving target. The tracking may be vision-based tracking, GPS-based tracking or the like. The system may have various flight control mode for capturing images of a target. The various modes may comprise a fly-to mode and a tracking mode. The UAV may be configured to fly towards the target when the UAV is in the fly-to mode. The UAV may be configured to track the target when the UAV is in the tracking mode. When in the tracking mode, the UAV may maintain a predetermined distance to the target or maintain the target in its field of view, and may or may not fly towards the target.

The system 100 may comprise a remote controller 120. The remote controller may be a control device for controlling the movable object, carrier and/or imaging device. The control device may be in communication with the movable object, carrier and/or imaging device. The communication can be a one-way communication or two-way communication. The control device may send control signals to the movable object, carrier and/or imaging device. The control signals may affect a zoom level of the imaging device and/or position of the movable object. The control signals may affect a carrier to adjust or maintain an orientation of the imaging device relative to the movable object, or may affect a location and/or orientation of the movable object. The movable object 110 may be configured to receive control data from the remote controller 120. The remote controller can be a remote control terminal can be configured to provide control data. The control data can be used to control, directly or indirectly, aspects of the movable object. In some embodiments, the control data can include navigation commands for controlling navigational parameters of the movable object such as the position, speed, orientation, or attitude of the movable object. The control data can be used to control flight of a UAV. The control data may affect operation of one or more propulsion units 150 that may affect the flight of the UAV. In other cases, the control data can include commands for controlling individual components of the movable object. For instance, the control data may include information for controlling the operations of the carrier 140. For example, the control data may be used to control an actuation mechanism of the carrier so as to cause angular and/or linear movement of the payload imaging device 130 relative to the movable object 110. As another example, the control data may be used to control the movement of the carrier without the payload. As another example, the control data may be used to adjust one or more operational parameters for the payload such as taking still or moving pictures, zooming in or out, turning on or off, switching imaging modes, change image resolution, changing focus, changing depth of field, changing exposure time, changing speed of lens, changing viewing angle or field of view, or the like. In other embodiments, the control data may be used to control a sensing system (not show), communication system (not shown), and the like, of the movable object.

In some embodiments, the control data may be generated based on information about a user input. The user input may be obtained by the remote controller 120. In some embodiments, the remote controller can be located at a location distant or remote from the movable object 110, carrier 140, and/or the imaging device 130. The remote controller can be disposed on or affixed to a support platform. Alternatively, the remote controller can be a handheld or wearable device. For example, the remote controller can include a smartphone, tablet, laptop, computer, glasses, gloves, helmet, microphone, or suitable combinations thereof.

The remote controller can be configured to display data received from the movable object via a display. The displayed data may include sensing data such as images (e.g., still images and videos) acquired by the imaging device carried by the movable object.

In some embodiments, the remote controller can be configured to obtain information about a user input indicative of a target shown within the image. The user input may be received via an input device. The input device may be a touchscreen. The input device may also be the display device for displaying the image. A user may indicate a target shown within the image by touching a region on the touchscreen. Various other input devices can be used to receive the user input. For example, the input device may include a joystick, keyboard, mouse, stylus, microphone, image or motion sensor, inertial sensor, and the like.

The remote controller can be configured to receive user input to control the movable object and/or other components coupled to the movable object as described elsewhere herein. Any suitable user input can be used to interact with the remote controller, such as manually entered commands, voice control, gesture control, or position control (e.g., via a movement, location or tilt of the terminal). For instance, the remote controller may be configured to allow a user to control a state of the movable object, carrier, payload, or any component thereof by manipulating a joystick, changing an orientation or attitude of the control terminal, interacting with a graphical user interface using a keyboard, mouse, finger, or stylus, or by using any other suitable methods.

In some embodiments, information about the user input indicative of the target may be obtained. The information may comprise a location within the display where the target is shown. The information may comprise a location within the display where the user touches or taps the touchscreen. The information may comprise an offset from a location of the target to a predetermined location within the display. For example, the target selected by the user may be displayed at a location deviated from the center of the display. In this case, the information may include an offset of the location of the target from the center of the display.

In some embodiments, control data may be generated based on the information about the user input indicative of the target. In some embodiments, the control data may further include a zoom level or a zoom factor. The control data may be used to effectuate an automatic control of a zoom level of the imaging device and an attitude of the imaging device relative to the target.

Based at least in part on the location or offset of the target from a predetermined location within the image, control signals may be generated (e.g., by one or more processors onboard the movable object) that cause adjustment that substantially cause the target to be displayed at or near the predetermined location within the display and at a predetermined zoom level or adjusting by a predetermined zoom factor. The adjustment may be performed in substantially real time as the imaging device is capturing one or more images. In some embodiments, the adjustment may be performed in substantially real time as the movable object is executing user-provided navigation commands (e.g., hovering or moving) and/or predetermined navigation paths. In some embodiments, the adjustment may be generated based on other information such as sensing data acquired by one or more sensors onboard the movable object (e.g., proximity sensor, or GPS sensor). For example, position information of the target being tracked may be obtained by a proximity sensor and/or provided by the target itself (e.g., GPS location). Such position information may be used, in addition to the offset within the image or location of the target within the image, to generate the adjustment.

The adjustment may pertain to the movable object, the carrier, and/or the imaging device. For example, the adjustment may cause the movable object and/or the imaging device to change its position, attitude, orientation, angular and/or linear velocity, angular and/or linear velocity, and the like. The adjustment may cause the carrier to move the imaging device relative to the movable object such as around or along one, two, three, or more axes. Furthermore, the adjustment may include adjustment to the zoom, focus, or other operational parameters of the imaging device.

In various embodiments, the adjustment to cause the target to be displayed at or near a predetermined location within the display may be achieved by controlling an attitude of one or more controllable objects such as the movable object, the carrier, the imaging device, or any combination thereof via control signals. In some embodiments, the controllable objects may be selected to implement an adjustment and the corresponding control signals may be generated based at least in part on the configurations or settings of the controllable objects. For example, an adjustment that involves rotation around two axes (e.g., yaw and pitch) may be achieved solely by corresponding rotation of the movable object around the two axes if the imaging device is rigidly coupled to the movable object and hence not permitted to move relative to the movable object. Such may be the case when the imaging device is directly coupled to the movable object, or when the imaging device is coupled to the movable object via a carrier that does not permit relative movement between the imaging device and the movable object. The same two-axis adjustment may be achieved by combining adjustment to both the movable object and the carrier if the carrier permits the imaging device to rotate around at least one axis relative to the movable object. In this case, the carrier can be controlled to implement the rotation around one or two of the two axes required for the adjustment and the movable object can be controlled to implement the rotation around one or two of the two axes. For example, the carrier may include a one-axis gimbal that allows the imaging device to rotate around one of the two axes required for adjustment while the rotation around the remaining axis is achieved by the movable object. Alternatively, the same two-axis adjustment may be achieved by the carrier alone if the carrier permits the imaging device to rotate around two or more axes relative to the movable object. For instance, the carrier may include a two-axis or three-axis gimbal.

In some embodiments, an adjustment of the zoom level or zoom factor of the image data may be achieved by controlling the zoom in/out level of the imaging device (e.g., if the imaging device supports the zoom level required), by controlling the movement of the movable object (e.g., so as to get closer to or farther away from the target), or by a combination of zoom in/out of the imaging device and the movement of the movable object. A processor onboard the movable object may make the determination as to which object or combination of objects to adjust. For example, if a zoom level is beyond a zoom-in capability of the imaging device, the movable object may be controlled to move closer to the target in addition to adjusting the zoom of the imaging device. In another example, a target or image may be zoomed out by a determined factor by performing a zoom-out function of the imaging device as well as moving the movable object away from the target. In another example, adjustment of a distance between the movable object and the zoom of the imaging device may be performed to achieve a fast zoom in/out effect. It should be noted that zoom of the imaging device may be an optical zoom, digital zoom or a combination of both.

In some embodiments, the adjustment may be implemented by taking into account other constraints. For example, in cases where the navigation path of the movable object is predetermined, the adjustment may be implemented by the carrier and/or imaging device without affecting the movement of the movable object. The navigation path of the movable object may be predetermined, for example, if a remote user is actively controlling the navigation of the movable object via a control terminal or if the movable object is navigating (e.g., autonomously or semi-autonomously) according to a pre-stored navigation path.

Examples of other constraints may include maximum and/or minimum limit for rotation angles, angular and/or linear speed, operational parameters, and the like for the movable object, the carrier, and/or the payload (e.g., imaging device). Such maximum and/or minimum threshold values may be used to limit the range of the adjustment. For example, the angular speed of the movable object and/or the imaging device around a certain axis may be capped by a maximum angular speed that is allowed for the movable object, the carrier, and/or the payload (e.g., imaging device). As another example, the linear speed of the movable object and/or the carrier may be capped by a maximum linear speed that is allowed for the movable object, the carrier, and/or the payload (e.g., imaging device). As yet another example, adjustment to the focal length of the imaging device may be limited by the maximum and/or minimum focal length for the particular imaging device. In some embodiments, such limits may be predetermined and depend on the particular configuration of the movable object, the carrier, and/or the payload (e.g., imaging device). In some instances, such configurations may be configurable (e.g., by a manufacturer, administrator, or user).

In some embodiments, the movable object can be configured to provide and the remote controller can be configured to receive data such as sensing data acquired by sensors onboard the movable object. Examples of sensing data may include image data acquired by an imaging device carried by the movable object or other data acquired by other sensors. For example, real-time or nearly real-time video can be streamed from the movable object and/or the imaging device to the remote controller. The sensing data may also include data acquired by global positioning system (GPS) sensors, motion sensors, inertial sensors, proximity sensors, or other sensors. In various embodiments, the data received by the remote controller from the movable object may include raw data (e.g., raw sensing data as acquired by the sensors) and/or processed data (e.g., information as processed by one or more processors on the movable object).

The movable object may be capable of communicating with the remote controller. The remote controller may communicate with the movable object itself, with a payload of the movable object, and/or with a carrier of the movable object, wherein the carrier is used to support the payload. Any description herein of communications with the movable object may also apply to communications with the payload of the movable object, the carrier of the movable object, and/or one or more individual components of the movable object (e.g., communication unit, navigation unit, propulsion units, power source, processors, memory storage units, and/or actuators).

The communications between the movable object and the remote controller may be wireless communications. Direct communications may be provided between the movable object and remote controller. The direct communications may occur without requiring any intermediary device or network. Indirect communications may be provided between the movable object and the remote controller. The indirect communications may occur with aid of one or more intermediary device or network. For instance, indirect communications may utilize a telecommunications network. Indirect communications may be performed with aid of one or more router, communication tower, satellite, or any other intermediary device or network. Various types of communications can include methods as described elsewhere herein.

The remote controller may be any type of external device. Examples of remote controller may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HMD), headbands), pendants, armbands, leg bands, shoes, vests), gesture-recognition devices, microphones, any electronic device capable of providing or rendering image data, or any other type of device. The remote controller may be a handheld object. The remote controller may be portable. The remote controller may be carried by a human user. In some cases, the remote controller may be located remotely from a human user, and the user can control the remote controller using wireless and/or wired communications. Various examples, and/or characteristics of remote controller are provided in greater detail elsewhere herein.

The remote controller may include one or more processors that may be capable of executing non-transitory computer readable media that may provide instructions for one or more actions. The remote controller may include one or more memory storage devices comprising non-transitory computer readable media including code, logic, or instructions for performing the one or more actions. The remote controller may include software applications that allow the remote controller to communicate with and receive imaging data from a movable object. The remote controller may include a communication unit, which may permit the communications with the movable object. In some instances, the communication unit may include a single communication unit, or multiple communication units. In some instances, the remote controller may be capable of interacting with the movable object using a single communication link or multiple different types of communication links.

The remote controller may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a graphical user interface (GUI). The GUI may show an image that may permit a user to control actions of the UAV. For instance, the user may select a target from the image. The target may be a stationary target or a moving target. The user may select a portion of the image (e.g., point, region, and/or object) to define the target and/or direction. The user may select the target by directly touching the screen (e.g., touchscreen). The user may touch a portion of the screen. The user may touch the portion of the screen by touching a point on the screen. The user may select the target and/or direction by selecting the portion of the image with aid of a user interactive device (e.g., mouse, joystick, keyboard, trackball, touchpad, button, verbal commands, gesture-recognition, attitude sensor, thermal sensor, touch-capacitive sensors, or any other device). A touchscreen may be configured to detect location of the user's touch, length of touch, pressure of touch, and/or touch motion, whereby each of the aforementioned manner of touch may be indicative of a specific input command from the user.

The image on the display may show a view collected with aid of a payload of the movable object. For instance, an image collected by the imaging device may be shown on the display. This may be considered a first person view (FPV). In some instances, a single imaging device may be provided and a single FPV may be provided. Alternatively, multiple imaging devices having different fields of view may be provided. The views may be toggled between the multiple FPVs, or the multiple FPVs may be shown simultaneously. The multiple FPVs may correspond to (or generated by) different imaging devices, which may have different field of views. A user at a remote controller may select a portion of the image collected by the imaging device to specify a target.

In another example, the image on the display may show a map that may be generated with aid of information from a payload of the movable object. The map may optionally be generated with aid of multiple imaging devices (e.g., right camera, left camera, or more cameras), which may utilize stereo-mapping techniques. In some instances, the map may be generated based on positional information about the UAV relative to the environment, the imaging device relative to the environment, and/or the UAV relative to the imaging device. Positional information may include posture information, spatial location information, angular velocity, linear velocity, angular acceleration, and/or linear acceleration. The map may be optionally generated with aid of one or more additional sensors, as described in greater detail elsewhere herein. The map may be a two-dimensional map or a three-dimensional map. The views may be toggled between a two-dimensional and a three-dimensional map view, or the two-dimensional and three-dimensional map views may be shown simultaneously. A user at a remote controller may select a portion of the map to specify a target. The views may be toggled between one or more FPV and one or more map view, or the one or more FPV and one or more map view may be shown simultaneously. The user may make a selection of a target or direction using any of the views. The portion selected by the user may include the target and/or direction. The user may select the portion using any of the selection techniques as described.

In some embodiments, the image may be provided in a 3D virtual environment that is displayed on the remote controller (e.g., virtual reality system or augmented reality system). The 3D virtual environment may optionally correspond to a 3D map. The virtual environment may comprise a plurality of points or objects that can be manipulated by a user. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated. A user at a remote controller can manipulate the points or objects in the virtual environment to control a flight path of the UAV and/or motion characteristic(s) of the UAV.

The information about the user input may comprise a location within the display where the target is shown. The information about the user input may comprise an offset of the location where the target is shown to a predetermined location within the display. The location of offset may be used to effectuate an automatic control of an attitude of the imaging device relative to the target so as to cause the target to be displayed at or near the predetermined location within the display. FIG. 2 illustrates examples of using the information about a target to control an attitude of the imaging device 230, in accordance with embodiments of the disclosure.

A display may be configured to show an image captured from the imaging device 230. The display may be comprised by a remote controller. In some embodiments, the display may be touchscreen. The display may be provided by an external device operably coupled to the remote controller. For example, the remote controller is operatively coupled with a mobile device (e.g., smartphone) running suitable mobile application software ("app") 220 that may be configured to receive inputs from a user. The app 220 may be configured to obtain information about the user input which is used to generate control instructions for the movable object. In some cases, a graphical user interface may be provided for displaying the image and receiving user input. The GUIs may be provided in a software, a software application, a web browser, etc. A zoom level control of the imaging device and attitude control of the imaging device relative to the target can be implemented using software, hardware, or a combination of hardware or software, on one or more computing devices.

An image 210 captured by an imaging device 230 carried by a movable object via a carrier 240 may be shown to a user. A user input may be one or more user action indicative of a target 221 shown in the image 210. For example, a user may tap or touch a spot on the touchscreen indicative of a region that is interested to the user. In some cases, the region of the display may show a target 221. The target may be objects or structures that the user wants to take a closer look. The target may be a portion of an object or structures that the user wants to focus on. In some cases, upon a user performs the action such as tap on the touchscreen, the location or coordinates of the location where the user touches the display within the image may be recorded as the location of the target. In some cases, any other location of the target may be used as the target location. For example, a graphical shape of the target maybe recognized and a center of the target may be used as the location of the target. Various coordinate systems can be used to define the location. For instance, the coordinate system can be the image coordinate or the display screen coordinate. The origin of the coordinate system can be defined in various ways such as the center of the image, center of the display screen, upper left corner of the image or upper left corner of the display screen. The image coordinates on the display provided by the app 220 and camera coordinates of the imaging device 230 may be mapped with a known relationship (e.g. transformation matrix). For instance, the x-y coordinates of the image plane may be mapped to the camera coordinates X-Y based on various intrinsic parameters of the camera including optical (e.g., focal length), geometric (e.g., geometric distortion), and digital characteristics (e.g., pixel size) of the camera and extrinsic parameters of the camera (e.g., location and orientation of camera with respect to a world frame). In some cases, the transformation from the image coordinates to the camera coordinates can be computed in real-time such that a translational offset in the image plane is mapped to an attitude adjustment of the imaging device.

The location of the target may be located anywhere in the image. The location may or may offset from a desired location ($u_0$, $v_0$). The desired location can be a predetermined location such as the center of the image or center of the display screen. For instance, assume the image has a width of W pixels and a height of H pixels, the desired location can be near the image center such that $u_0=W/2$, and/or $v_0=H/2$. The desired location can be located anywhere else within the image that may or may not be the center. The desired location can be user defined. For instance, a user may be allowed to set up a desired location to view a target according to a user preference.

In some cases, an offset between the location of the target (u,v) and the desired location ($u_0$, $v_0$) may be computed and used to control an attitude of the imaging device so as to bring the target to be displayed at or near the desired location within the display screen. In some embodiments, the offset from target location to the desired location in the image coordinates may be used to derive one or more rotational movement of the imaging device around one or more axes. The rotational movement may adjust the attitude of the imaging device relative to the target such that after the rotation the target is positioned at or near the desired location on the display screen. The attitude of the imaging device relative to the target can be determined based on transformation relationship between the image plane and the camera coordinates using various computer vision methods. For example, intrinsic parameters that characterize the optical, geometric and digital properties of the imaging device, transformation from camera frame to pixel coordinates, and transformation from the camera frame to a world frame may be used to map a coordinate in the image plane to an attitude angle of the imaging device.

The rotational movement may adjust the attitude of the imaging device relative to the target such that after the rotation the target is positioned at or near the desired location on the display screen. In some cases, a translational movement of the imaging device may adjust the attitude of the imaging device relative to the target. In some cases, a combination of translational movement and rotational movement of the imaging device may adjust the attitude of the imaging device relative to the target. The attitude of the imaging device relative to the target may be automatically adjusted by adjusting an attitude of the imaging device relative to the movable object, an attitude of the movable object relative to the target, or both the attitude of the imaging device and the attitude of the movable object.

In some cases, the target may move relative to the imaging device while the imaging device in a stationary attitude. In these cases, the rotational movement for adjusting the attitude of the imaging device may take into account of the relative movement of the target with respect to the imaging device. For example, the imaging device and movable object may be in an automatic tracking mode. The original tracked object may not be the same target as indicated by the user. In this case, once the user input a gesture indicating the target, the imaging device and movable object may automatically adjust the attitude of the imaging device and a zoom level of the imaging device such that the target is displayed at a predetermined location on the display (e.g., center) while may or may not be tracked.

The attitude of the imaging device relative to the target can be adjusted by a rotational movement and/or translational movement for the imaging device. The rotational movement can be about one or more axes (e.g., roll axis, pitch axis, or yaw axis). A rotational movement for the imaging device may be achieved, collectively or individually, via adjustment to the movable object and the carrier. The rotation around one, two, three or more axes may be achieved by a rotation of the movable object, a rotation of the imaging device via the carrier relative to the movable object, or a combination of both. The translational movement can be along one, two, three or more axes. A translational movement for the imaging device may be achieved, collectively or individually, via adjustment to the movable object and the carrier. The translational movement along one, two, three or more axes can be achieved by a translational movement of the movable object relative to the target, a translational movement of the imaging device via the carrier relative to the movable object, or a combination of both. In some embodiments, a combination of both rotational movement and translational movement of the imaging device may be performed to adjust the attitude of the imaging device relative to the target.

In some embodiments, the movable object may be capable of rotating around up to three orthogonal axes such as pitch, yaw and roll axes. The movable object may be controlled to have translational movement or linear velocity relative to the target. The imaging device may be coupled to the movable object via a carrier. The carrier may be capable of causing the imaging device to move relative to the movable object around up to three orthogonal axes. The carrier may allow the imaging device perform both rotational and translational movement relative to the movable object. Accordingly, the attitude of the imaging device can be adjusted collectively or individually, via adjustment to the movable object and the carrier.

In some embodiments, a zoom level of the imaging device is also automatically adjusted in response to the user input indicative to the target. In some cases, a zoom level of the imaging device is adjusted concurrently with the adjustment to the attitude of the imaging device. For instance, while the imaging device is rotated to an attitude so as to cause a target to be displayed at a predetermined location on the display, an optical zoom or digital zoom of the imaging device is also performed such that by the time the target is moved to the predetermined location, a size of the target is also enlarged by a predetermined zoom factor. In some cases, adjustment of an attitude of the imaging device may be quicker than adjustment of a zoom level when using an optical zoom. In this case, while the attitude of the imaging device is adjusted via a carrier, digital zoom may be performed. The zoom level of the image may be increased to a desired zoom level or by a predetermined zoom factor by digital zoom during the attitude adjustment. Then once the desired zoom level is reached, digital zoom may be decreased while the optical zoom may be increased, until eventually the optical zoom is at the desired level, and digital zoom is back to none. In some cases, a zoom level of the imaging device is adjusted after the attitude adjustment. In other cases, a zoom level of the imaging device is adjusted prior to the attitude adjustment.

The zoom level of the imaging device may be controlled by adjusting a zoom parameter of the imaging device. For instance, a zoom factor of the imaging device may be adjusted by, collectively or individually, optical zoom and digital zoom. The zoom level may be controlled by adjusting a distance of the imaging device from the target. For instance, the movable object may move closer to the target for a zoom-in effect and move away from the target for a zoom-out effect. The zoom level may be controlled by adjusting a combination of a zoom of the imaging device and a distance of imaging device from the target. A variety of ways can be used to determine the combination. For instance, a zoom of the imaging device may be performed first, if the desired zoom level is beyond the capability of the imaging device, the movable object may move closer or further from the target to achieve the desired zoom level. In another instance, the zoom of the imaging device and changing a distance between the imaging device and the target may be performed substantially simultaneously such that the zoom level can be reached faster than a sequential performance.

In some embodiments, the zoom level of the imaging device is automatically adjusted by a predetermined factor. In some embodiments, the predetermined factor is a zoom-in factor. Alternatively, the zoom level of the imaging device is automatically adjusted to get to a predetermined zoom level. For example, in response to a user input indicative of a target shown on the display, in additional to being positioned at or near a desired location (e.g., center of the display), the target may also be enlarged by a predetermined zoom-in factor such that the user may be allowed to view more details of the target. The predetermined zoom-in factor can be set up by a user. The zoom-in factor can be various numbers such as 1.1×, 1.5×, 2×, 3×, 4×, 5, 6×, 10×, 20×, and the like. A user may be allowed to set the predetermined factor at any time such as before activating the imaging device, during operation of the imaging device, or at any other suitable time as needed. In some cases, a default zoom-in factor may be provided by the software based on various characteristics of the imaging device such as focal length, zoom capability, or an optimal image quality. In some cases, the default zoom-in factor may be provided by a user. For instance, a user may select or input a default zoom-in factor via the application provided on the remote controller.

Figure 3:
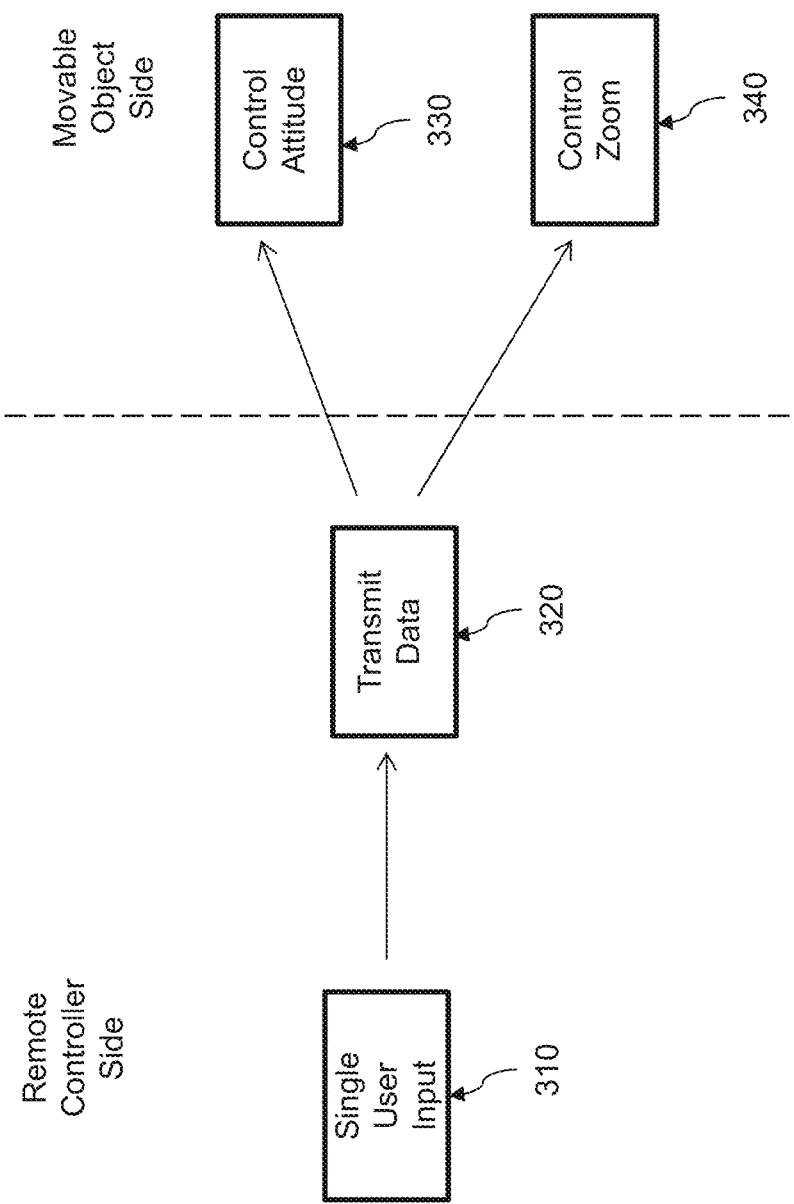
FIG. 3 shows a schematic block diagram of data transmission from the remote controller to the movable object, the carrier or the imaging device.

In some embodiments, the remote controller may further comprise a communication unit configured to communicate with at least one of the imaging device, a carrier supporting the imaging device, or the movable object. The communication unit may be configured to transmit data to effectuate an automatic control of a zoom level of the imaging device and an attitude of the imaging device relative to the target. FIG. 3 shows a schematic block diagram of data transmission from the remote controller to the movable object, the carrier or the imaging device.

As described above, data may be generated based on information about a user input indicative of a target shown within an image. The user input 310 may be a simplified user action such as a tap or touch on a touchscreen. In some embodiments, the user input may be a single user action. A single user action can include a single operation with respect to an input device such as a single click of a mouse, a tap of a stylus, a single swipe on a touch screen and the like. A single user action can be a single touch gesture. A single gesture may be a single input to the touchscreen. A single gesture may include a single motion by a user. The single motion by a user may be substantially in a single direction, or may be in multiple directions. The single user action may be accomplished using a single hand of the user. The single user action may be accomplished using a single finger or multiple fingers of the user. Multiple fingers may be used simultaneously. The single user action may be accomplished within a short time span. For instance, the single user action may be accomplished within less than or equal to about 5 seconds, 3 seconds, 2 seconds, 1 second, 0.5 seconds, 0.1 seconds, or 0.01 seconds. With the provided system and devices, a user is allowed to perform a single user action that leads to a positioning and zooming a selected target. The user input can be a haptic input. The user input can be of any suitable form, such a tap on a region of the touchscreen, drag a target to a desired location, drag an indicator and drop on top of a target and the like. The tap can be a single tap, a double tap, a deep touch, light touch, single-point touch, multi-point touch and various other actions that may or may not be defined by a user. A deep touch may be a touch where the degree of pressure exceeds a threshold amount. A long touch may be a touch where the length of time exceeds a threshold amount. A user may tap on a target displayed on the touchscreen and information comprising location of the target within the display screen may be obtained. In some cases, the information may be used to generate data to effectuate an automatic control of a zoom level of the imaging device 330 and an attitude of the imaging device relative to the target 340.

The data may be control data for controlling (a) a zoom level of an imaging device and (b) an attitude of the imaging device relative to the target. The control data may effectuate the control of (a) and (b) substantially concurrently. The control data may comprise coordinates of a user-selected target. The coordinates of the selected target within an image can be used to generate a rotation angle for adjusting an attitude of the imaging device relative to the target. Alternatively, the control data may comprise an offset between current position of the selected target and a predetermined position. The control data may comprise a rotation angle correspond to the offset. Details about obtaining a rotation angle of the imaging device based on the coordinate of the target is further discussed in FIG. 11. Data containing the rotation angle may be transmitted to the imaging device, a carrier supporting the imaging device, or the movable object for adjusting the attitude of imaging device by the rotation angle. The rotation angle may be used to generate control commands for one or more actuators of the carrier and/or the movable object. The control data may comprise a predetermined factor by which to automatically adjust the zoom level of the imaging device. The control data may comprise instructions to be transmitted to the imaging device, a carrier supporting the imaging device, or the movable object. The control data may comprise instructions for controlling the zoom level of the imaging device via optical zoom control and/or digital zoom control.

The control data may comprise information for adjusting an attitude of the imaging device including at least one of the following: offset between a location of the selected target and a predetermined location, coordinates of the selected target on the display, and a rotation angle corresponding to the offset. The control data may also comprise information for adjusting a zoom level of the imaging device including at least one of the following: a desired zoom level, a predetermined zoom factor by which the zoom level is to be adjusted.

The data may include instructions to at least one of the imaging device, a carrier supporting the imaging device, or the movable object. The instructions may be for controlling a zoom level of the imaging device and an attitude of the imaging device relative to the target. Controlling of the attitude of the imaging device relative to the target can be achieved by effectuating movement of the movable object, and/or the carrier as described above. Controlling of the zoom level of the imaging device can be achieved by adjusting zoom level of the imaging device (e.g., optical zoom and/or digital zoom) and/or adjusting a distance from the imaging device to the target (e.g., move the movable object).

In some embodiments, the data may be generated by one or more processors on-board the remote controller. In one example, the data may comprise a target attitude or angles of the imaging device that the attitude corresponds to displaying the target at a predetermined location within the image, and the attitude angle of the imaging device may be used to generate control commands to the carrier and/or the movable object by one or more processors on-board the movable object. In another example, the data may comprise one or more rotational angles or translational movement of the carrier and/or movable object, and the rotational angles or translational movement may be used to generate control commands to the carrier and/or the movable object by one or more processors on-board the movable object. In a further example, the data may comprise the coordinates of the target within the image, and a movement of the carrier and/or movable object to cause the target to be displayed at a predetermined location within the image may be determined by one or more processors on-board the movable object. Control command for one or more actuators of the carrier and/or the movable object can be generated based on the movement. The data may also comprise a predetermined factor by which to automatically adjust the zoom level of the imaging device.

Data generated by the remote controller may be used to effectuate an automatic control of an attitude of the imaging device relative to a target and a zoom level of the imaging device. The data may comprise a predetermined factor such as zoom factor as well as a location of a target within the image. The data may be used to generate control commands for one or more actuators of the carrier and/or the movable object. In some cases, the control commands to the movable object may be generated by a flight controller for controlling one or more propulsion units of movable object. In some cases, control commands to the carrier may be generated by a control unit for the carrier for controlling one or more actuators (e.g., motor) of the carrier. The control unit may or may not be comprised by the flight controller. In some cases, control commands to the imaging device may be generated by one or more processors of the imaging device for controlling a zoom motor of the imaging device. The flight controller, control unit for the carrier, or processors for the imaging device may be provided on-board the movable object, on-board the carrier, on-board the imaging device, and/or on an external device or network. The flight controller may include one or more processors.

The flight controller may control flight of the movable object. Optionally, the flight controller may generate one or more flight instructions to be provided to one or more propulsion units of the movable object. The flight controller may be in communication with one or more propulsion units of the movable object.

Information from one or more sensors may be provided to the flight controller. For example, information from one or more sets of IMUs may be provided to the flight controller. The one or more sets of IMUs may be on-board the movable object, on-board a carrier and/or on-board a payload. The data from the IMUs may be indicative of positional information of the movable object, the carrier, and/or the payload. The flight controller may optionally use the information from the one or more sensors in controlling flight of the UAV. Optionally the information from the one or more sensors may be used to control position of the imaging device relative to the UAV and/or its environment.

The flight controller may control attitude of the movable object relative to a target. The flight controller may generate control commands to the one or more propulsion units of the movable object such that an attitude or orientation (e.g., heading direction) of the movable object relative to a target may be controlled.

The flight controller may receive information from the user terminal. The flight controller may receive information indicative of the user selection of a target and/or direction. The flight controller may generate a flight path and/or control flight of the UAV in response to the selection of the target and/or direction.

The data to effectuate a control of an attitude of the imaging device relative to a target may comprise instructions to the carrier. The data may be used for generating control commands for effectuating movements of the carrier. In some cases, control commands for controlling one or more actuators of the carrier can be generated by a control unit of the carrier. In some embodiments, one or more frame components of the carrier may be controlled to move relative to one another such that the imaging device supported by the carrier may have a relative movement to the movable object. Details regarding controlling the attitude of the imaging device via a carrier are described elsewhere herein.

The data may also comprise a predetermined factor to effectuate an automatic control of a zoom level of the imaging device. The predetermined factor may be a zoom in factor. In some cases, the predetermined factor may be used for generating control commands to one or more zoom motors of the imaging device to adjust a focal length of the imaging device such that the predetermined factor can be achieved.

In some embodiments, the data may be generated to effectuate an automatic control of a size of the target shown on the display and a position of the target shown on the display. Effectuation of the control over the position of the target has been described above. In some embodiments, an effectuation of a size of the target shown on the display may be achieved by automatically controlling a zoom level of the imaging device, a distance of the imaging device to the target, or both the zoom level of the imaging device and the distance of the imaging device to the target. For example, to enlarge a size of a target, a zoom motor of the imaging device may be controlled to adjust a focal length of the imaging device, or the movable object may be controlled to moving towards the target to reduce the distance.

In some embodiments, the data may be used to generate control commands for moving the movable object relative to a target such that a distance between the movable object and the target can be adjusted. Control commands may be generated by a flight controller to control one or more propulsion units of the movable object. The flight controller may control a movement of the movable object such that a distance between the movable object and a target can be controlled. The flight controller may optionally generate a flight path for the movable object. The flight path may be toward a target object. In some embodiments, a flight path may be toward a stationary object. The flight path may optionally be heading towards a moving object, but the heading and/or path may be altered as the object is moving. Alternatively, no flight path is generated for the moving object. The flight path may include a heading in a target direction. In some embodiments, the data comprising both of the instruction for controlling the attitude of the imaging device and the zoom level of the imaging device may be transmitted to at least one of the imaging device, a carrier supporting the imaging device or the movable object 320. For example, the data may be transmitted from the remote controller to a communication unit of the movable object, and the instruction for controlling the zoom level may be further transmitted from the movable object to the imaging device. Similarly, the data comprising instructions for effectuating attitude of the movable object can be relayed by the imaging device then transmitted to a controller on-board the movable object. In some embodiments, the data comprising instructions for controlling the zoom level of the imaging device may be transmitted to the imaging device whereas the instructions for controlling the attitude maybe transmitted to the movable object and/or the carrier. The control data provided transmitted by the remote controller can be configured to control a state of one or more of the movable object, carrier, or imaging device. Alternatively or in combination, the carrier and imaging device can also each include a communication unit configured to communicate with remote controller, such that the remote controller can communicate with and control each of the movable object, carrier, and imaging device independently.

Figure 4:
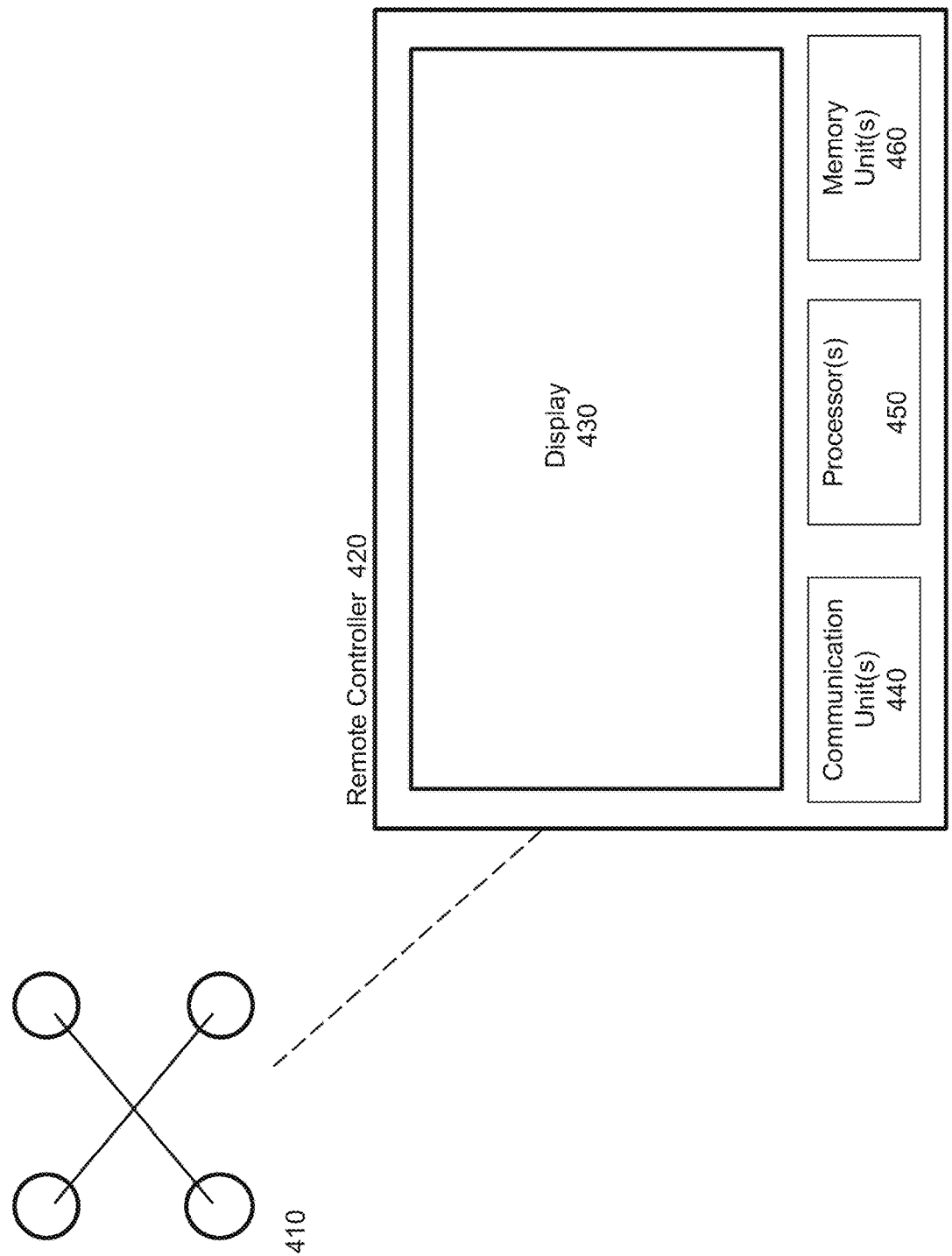
FIG. 4 illustrates an exemplary remote controller for controlling a movable object, in accordance with embodiments.

FIG. 4 illustrates an exemplary remote controller 420 for controlling a movable object 410, in accordance with embodiments. The remote controller includes a display 430 for displaying sensing data such as image data captured by an imaging device or image sensor coupled to a movable object such as a UAV. The image data may include images captured by an imaging device or image sensor onboard the movable object. The images may include one or more targets that a user may want to view at a predetermined location and at a desired zoom level within the image. The target may be displayed within the display 420. A user input indicative of the target may be used to generate control data to control the movable object and/or the imaging device.

The remote controller 420 may include one or more displays 430. The display may be a touch-sensitive display screen. The touch-sensitive screen may be configured to receive a user input indicative of a target displayed within the screen. The display may be configured to display images to a user. The images may be transmitted from the movable object or the imaging device. A touch-sensitive display screen may have a touch-sensitive surface, sensor or set of sensors that accepts input from the user based on haptic and/or tactile contact. The touch-sensitive display screen and any associated components may detect contact (and any movement or breaking of the contact) on the touch-sensitive display screen and converts the detected contact into interaction with user-interface objects (e.g., a target or region that is interested to the user) that are displayed on the touch-sensitive screen.

The touch-sensitive display screen may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch-sensitive screen. The touch-sensitive display screen may be able to detect various touch gestures such as tap, pinch, swipe, hold, deep press, long press, and the like.

The remote controller can also include one or more input devices for receiving other user input to control the movable object 410 or components of the movable object. Such input device may include joysticks, buttons or switches, keyboard, mouse, or any suitable mechanisms. For example, one or more buttons or switches may be used to switch between different modes such as navigation modes of the movable object. Joysticks and wheels may be used to control a movement or attitude of the movable object, carrier or the imaging device.

The remote controller may comprise one or more processors 450. The one or more processors may include a programmable processor (e.g., a central processing unit (CPU)), a field programmable gate array (FPGA) and/or one or more ARM processors. The one or more processors can be operatively coupled to one or more memory units 460. The memory unit(s) may include transitory and/or non-transitory storage media. The non-transitory computer readable medium can store logic, code, and/or program instructions executable by the one or more processors for performing any suitable embodiment of the methods described herein. The memory can include one or more memory units (e.g., removable media or external storage such as an SD card or random access memory (RAM)). In some embodiments, data from the input device of the remote controller can be directly conveyed to and stored within the memory units. For example, the one or more processors can be configured to execute instructions to generate data based on information about a user input (e.g., tap on the touchscreen) indicative of a target shown within the display. The one or more processors may or may not generate control commands to the movable object or the imaging device based on the user input, cause the communication units 440 to transmit and/or receive data, and the like. The memory units can store image data or other data received from external devices (e.g., movable object). In some embodiments, the memory units can be used to store user input such as user defined zoom level of the imaging device and user defined touch actions.

The non-transitory computer readable medium 460 may comprise program instructions for showing, on the display, the image captured by the imaging device supported by the movable object 410. The program instructions may also comprise instructions to cause the one or more processors to obtain information about a user input indicative of a target shown within the image such as by analyzing a location of a touching gesture on the display. The program instructions may then cause the processor(s) to generate data to effectuate control of the movable object and the imaging device so as to cause the target shown on the display in a desired size and at a desired location.

In some embodiments, the remote controller can be operably coupled to other computing device (e.g., computer, laptop, tablet, smartphone, or other mobile device). The other computing device may comprise a display interfacing with a user. The other computing device may receive user input indicative of a target shown on the display and obtain information for controlling the imaging device. In some cases, the other computing device may be configured to transmit the information, comprising location of the target shown on the display and/or a zoom level or zoom factor provided by a user, to the remote controller. The remote controller may further generate data based on the information for controlling the movable object, carrier or the imaging device. In some cases, the other devices may be configured to generate control data based on the user input and communicate with the movable object, carrier or imaging device directly. The other computing device can be a remote device. The movable object can be configured to communicate with the remote device (e.g., computer, laptop, tablet, smartphone, or other mobile device) in addition to the remote controller, or instead of the remote controller. The remote controller may also be configured to communicate with the remote device as well as the movable object. The remote device can be configured to transmit data to the movable object or imaging device, receive data from the movable object or imaging device, transmit data to the remote controller, and/or receive data from the remote controller. Optionally, the remote device can be connected to the Internet or other telecommunications network, such that data received from the movable object and/or remote controller can be uploaded to a website or server.

The remote controller may further comprise a communication unit 440 configured to communicate with at least one of the imaging device, a carrier supporting an imaging device, or the movable object. The communication unit may be able to transmit the data comprising instructions to control an attitude of the imaging device relative to a target and instructions of control a zoom level of the imaging device. The communication unit can be configured to transmit and/or receive data from one or more remote devices (e.g., movable object, payload, base station, and the like). For example, the communication unit can be configured to transmit control data (e.g., location of target within the image, zoom level) to external systems or devices such as movable objects, carriers, and/or imaging device. The communication unit can also be configured to receive data (e.g., image data and sensing data) from such external systems or devices. In some embodiments, the communication unit can include a transmitter and a receiver respectively configured to transmit and receive data to and from remote devices. In some embodiments, the communication unit can include a transceiver that combines the functionalities of the transmitter and the receiver. In some embodiments, the transmitter and the receiver can communicate with each other as well as with the one or more processors.

Any suitable means of communication can be used, such as wired communication or wireless communication described herein. The transmission link for transmitting data to effectuate movement of the movable object and/or the imaging device may or may not be a separate link from the image transmission link. Any suitable means of communication can be used for the communication unit and/or the image transmission unit, such as wired communication or wireless communication. For example, the communication unit can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. In addition to the information comprising a zoom level control of the image and position of a target shown in the image, the communication unit can also be configured to transmit and/or receive sensing data from other sensors onboard the movable object, positional and/or motion information determined by processing the sensing data, predetermined control data, user commands from remote control terminals, and the like.

In one aspect of the disclosure, method of capturing an image is provided. The method may comprise: showing the image captured by an imaging device on a display, where the imaging device is supported by a movable object; obtaining information about a user input indicative of a target shown within the image; and generating data, based on the information about the user input indicative of the target, to effectuate automatic control of (a) a zoom level of the imaging device and (b) an attitude of the imaging device relative to the target.

Figure 8:
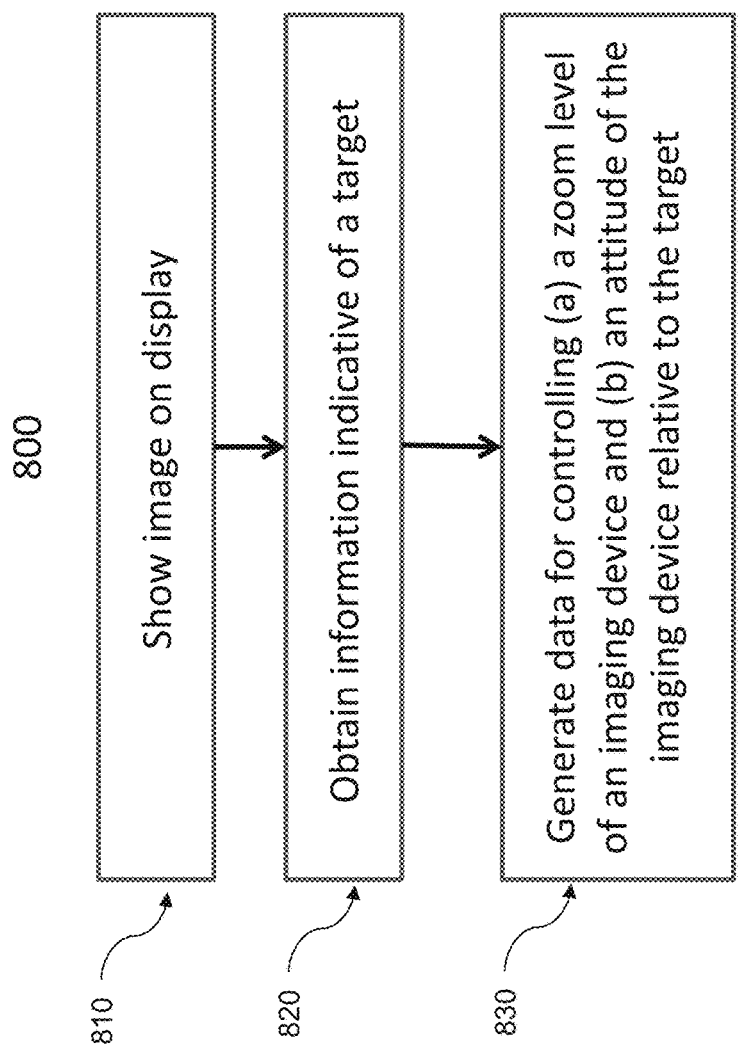
FIG. 8 illustrates an exemplary process for controlling an imaging device, in accordance with embodiments.

According to some other aspects of the present disclosure, an interactive user interface is provided for selecting and viewing, in substantially real time, image captured by an imaging device supported by a movable object described herein such as a UAV. Such a user interface may be provided by a remote controller such as described herein. FIG. 8 illustrates an exemplary process 800 for controlling an imaging device, in accordance with embodiments. Aspects of the process 800 may be performed by a remote controller such as described herein.

The process 800 includes displaying 810 one or more images captured by the movable objects. The images may be captured by an imaging device coupled to the movable object via a carrier as described herein. The carrier may permit the imaging device to move relative to the movable object. The imaging device may alternatively be coupled directly to the movable object without a carrier. The images may be transmitted to a remote controller from the movable object or directly from the imaging device. The images thus received by the remote controller may be decompressed or otherwise processed before being displayed on a user interface associated with the remote controller. The user interface may be provided by a display that is integral to the remote controller. Alternatively, the display may be separate from but operatively connected to the remote controller. The images thus displayed may be static (e.g., still images) or dynamic (e.g., videos).

In some embodiments, the images may be displayed or streamed in substantially real time as the images are received from the movable object and/or the imaging device. In some embodiments, the images are transmitted from the movable object and/or imaging device in substantially real time as the images are captured by the imaging device. In other cases, there may be some delay between the capture and/or transmission of the images and the display of the images.

In some embodiments, the process 800 includes obtaining information 820 indicative of a target. The information may be about a user input indicative of a target shown within at least one of the images being displayed. The user may provide the user input via the same user interface that displays the images. The user input may be a single user action. For example, in some embodiments, the user selection of the target is achieved by a user selecting a region of the at least one of the one or more images being displayed on the display, the selected region may correspond to the target. For example, the user may select the target by directly touching a touchscreen using a finger or stylus. Selection of the target region can involve any suitable motion including touching or tapping, swiping, circling, clicking, or the like associated with any suitable input methods such as described herein.

The user-selected target can be used to generate 830 control data for controlling (a) a zoom level of an imaging device and (b) an attitude of the imaging device relative to the target. The control data may effectuate the control of (a) and (b) substantially concurrently. The control data may comprise coordinates of the user-selected target. The coordinates of the selected target within an image can be used to generate a rotation angle for adjusting an attitude of the imaging device relative to the target. Details about obtaining a rotation angle of the imaging device based on the coordinate of the target is further discussed in FIG. 11. Data containing the rotation angle may be transmitted to the imaging device, a carrier supporting the imaging device, or the movable object for adjusting the attitude of imaging device by the rotation angle. The rotation angle may be used to generate control commands for one or more actuators of the carrier and/or the movable object. For example, one or more actuators of the carrier may be controlled to move one or more frame components of the carrier relative to one another such that the imaging device is moved relative to the movable object. In another example, in response to the control commands, one or more rotors of the movable objet may be controlled to generate thrust so as to control an attitude or position of the movable object relative to a target. The control data may comprise a predetermined factor by which to automatically adjust the zoom level of the imaging device. The control data may comprise instructions to be transmitted to the imaging device, a carrier supporting the imaging device, or the movable object. The control data may comprise instructions for the controlling the zoom level of the imaging device via optical zoom control and/or digital zoom control.

In some embodiments, one or more zoom controls may further be displayed to a user on the display. A user may control zoom level of the imaging device by the plurality of zoom controls provided on the display. The plurality of zoom controls may comprise a zoom-in control configured to increase the zoom level of the imaging device, a zoom-out control configured to decrease the zoom level of the imaging device, and a reset zoom level control configured to set the zoom level of the imaging device to a pre-set zoom level. The pre-set zoom level can be user-defined.

Figure 9:
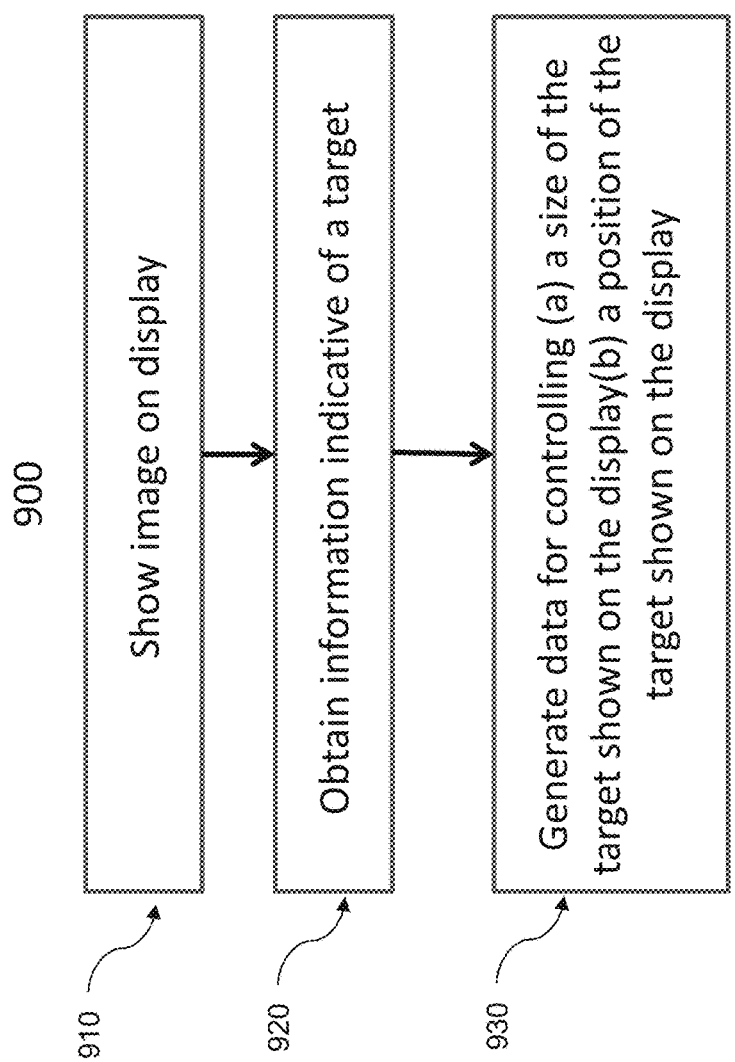
FIG. 9 illustrates another exemplary process for capturing an image, in accordance with embodiments.

FIG. 9 illustrates another exemplary process 900 for capturing an image, in accordance with embodiments. Aspects of the process 900 may be performed by a remote controller such as described herein.

The process 900 includes displaying 910 one or more images captured by the movable objects. The process of displaying images 910 can be the same process 810 as described in FIG. 8.

In some embodiments, the process 900 includes obtaining information 920 indicative of a target. The information is about a user input indicative of a target shown within at least one of the images being displayed. The process of obtaining information 920 can be the same process 820 as described in FIG. 8.

The user-selected target can be used to generate 830 control data for controlling (a) a size of the target shown on the display (b) a position of the target shown on the display. The control data may effectuate the control of (a) and (b) substantially concurrently. The position of the target shown on the display can be controlled by controlling an attitude of the imaging device relative to a target. Adjusting the attitude of the imaging device relative to the target may lead to an adjustment of the position of the target shown on the display. In some embodiments, an offset of the target from a predetermined location shown on the display can correspond to a rotation angle of the imaging device. The control data may comprise coordinates of the user-selected target. For example, the coordinates of the selected target within an image can be used to generate a rotation angle for adjusting an attitude of the imaging device relative to the target. Data containing the rotation angle may be transmitted to the imaging device, a carrier supporting the imaging device, or the movable object for adjusting the attitude of imaging device by the rotation angle. The rotation angle may be used to generate control commands for one or more actuators of the carrier and/or the movable object. The size of the target shown on the display can be controlled by controlling a zoom level of the imaging device, a distance of the imaging device to the target, or both the zoom level of the imaging device and the distance of the imaging device to the target. For example, a size of the target may be enlarged by controlling the movable object moving closer to the target in additional to increasing a zoom-in level of the imaging device. The control data may comprise a predetermined factor by which the size of the target is adjusted. The control data may comprise instructions to be transmitted to the imaging device, a carrier supporting the imaging device, or the movable object. The control data may comprise instructions for the controlling the zoom level of the imaging device via optical zoom control and/or digital zoom control, and/or instructions for controlling one or more actuators of the movable object.

In some embodiments, one or more zoom controls may further be displayed to a user on the display. A user may control zoom level of the imaging device by the plurality of zoom controls provided on the display. The plurality of zoom controls may comprise a zoom-in control configured to increase the zoom level of the imaging device, a zoom-out control configured to decrease the zoom level of the imaging device, and a reset zoom level control configured to set the zoom level of the imaging device to a pre-set zoom level. The pre-set zoom level can be user-defined.

In another aspect of the disclosure, systems and methods of controlling a zoom level of an image is provided. In some embodiments, the method may comprise: showing, on a display, one or more images captured by an imaging device supported by a movable object; obtaining information about a single user input indicative of adjusting a zoom level of an image shown on the display to a pre-set zoom level or a predetermined zoom factor; and generating instructions, based on the single user input, to effectuate an automatic adjustment of (a) a zoom level of the imaging device, (b) a distance of the imaging device from a target within the image, or (c) both the zoom level and the distance of the imaging device, such that (i) the image shown on the display is at the pre-set zoom level (ii) the zoom level of the image shown on the display is adjusted by the predetermined zoom factor.

Figure 10:
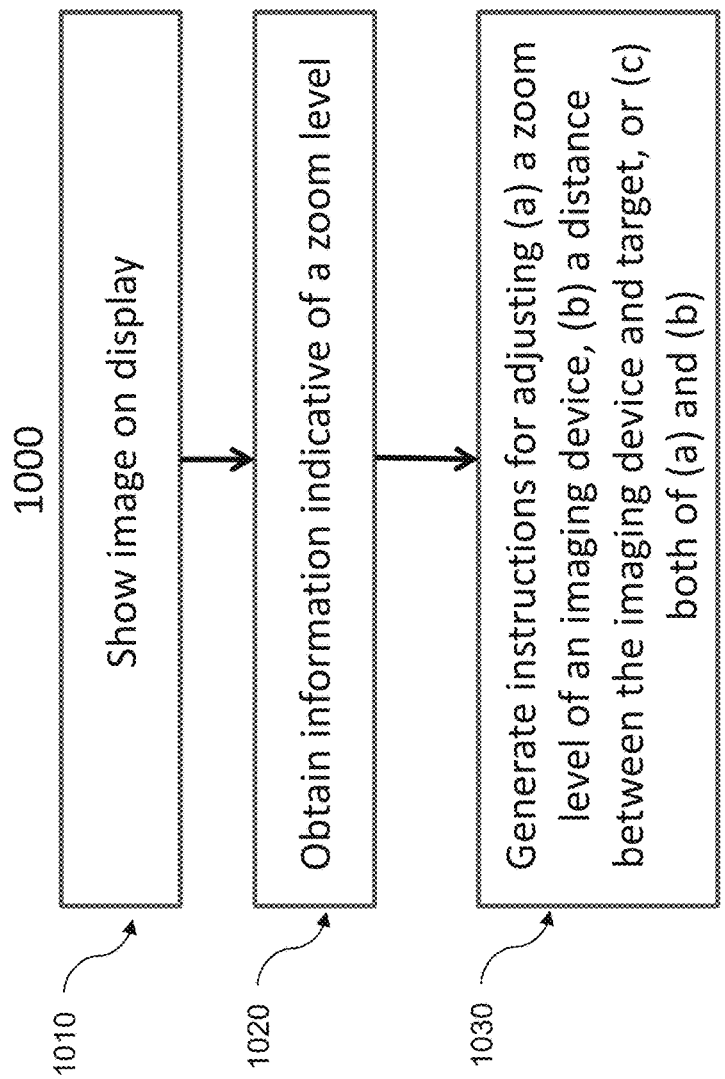
FIG. 10 illustrates an exemplary process for controlling a zoom level of an image as described above.

FIG. 10 illustrates an exemplary process 1000 for controlling a zoom level of an image as described above. The process 1000 includes displaying 1010 one or more images captured by the movable objects. The process of displaying images 1010 can be the same process 810 as described in FIG. 8.

In some embodiments, the process 1000 includes obtaining information 1020 about a single user input indicative of adjusting a zoom level of an image shown on the display to a pre-set zoom level or a predetermined zoom factor. The user may provide the user input via the same user interface that displays the images. In some embodiments, the single user input may be a touch of a predetermined region of the display. The predetermined region may show a default zoom control that causes the image to zoom to the pre-set zoom level. The user input can involve any suitable motion including touching or tapping, swiping, circling, clicking, or the like associated with any suitable input methods such as described herein. The pre-set zoom level may be a 1× optical zoom, or an original zoom level at which the imaging device starts capturing images. The pre-set zoom level can be selected or defined by a user. In some cases, a user may select the pre-set zoom level using a menu provided on the display. The menu may be hidden and become visible when the user touches the display. For example, the menu may become visible when a user performs a long touch or a deep touch on the display. The menu may also provide options for a user to select a zoom factor for one or more zoom controls. The one or more zoom controls may comprise a zoom-in control configured to increase the zoom level of the imaging device, a zoom-out control configured to decrease the zoom level of the imaging device, and a reset zoom level control configured to set the zoom level of the imaging device to a pre-set zoom level.

Figure 5:
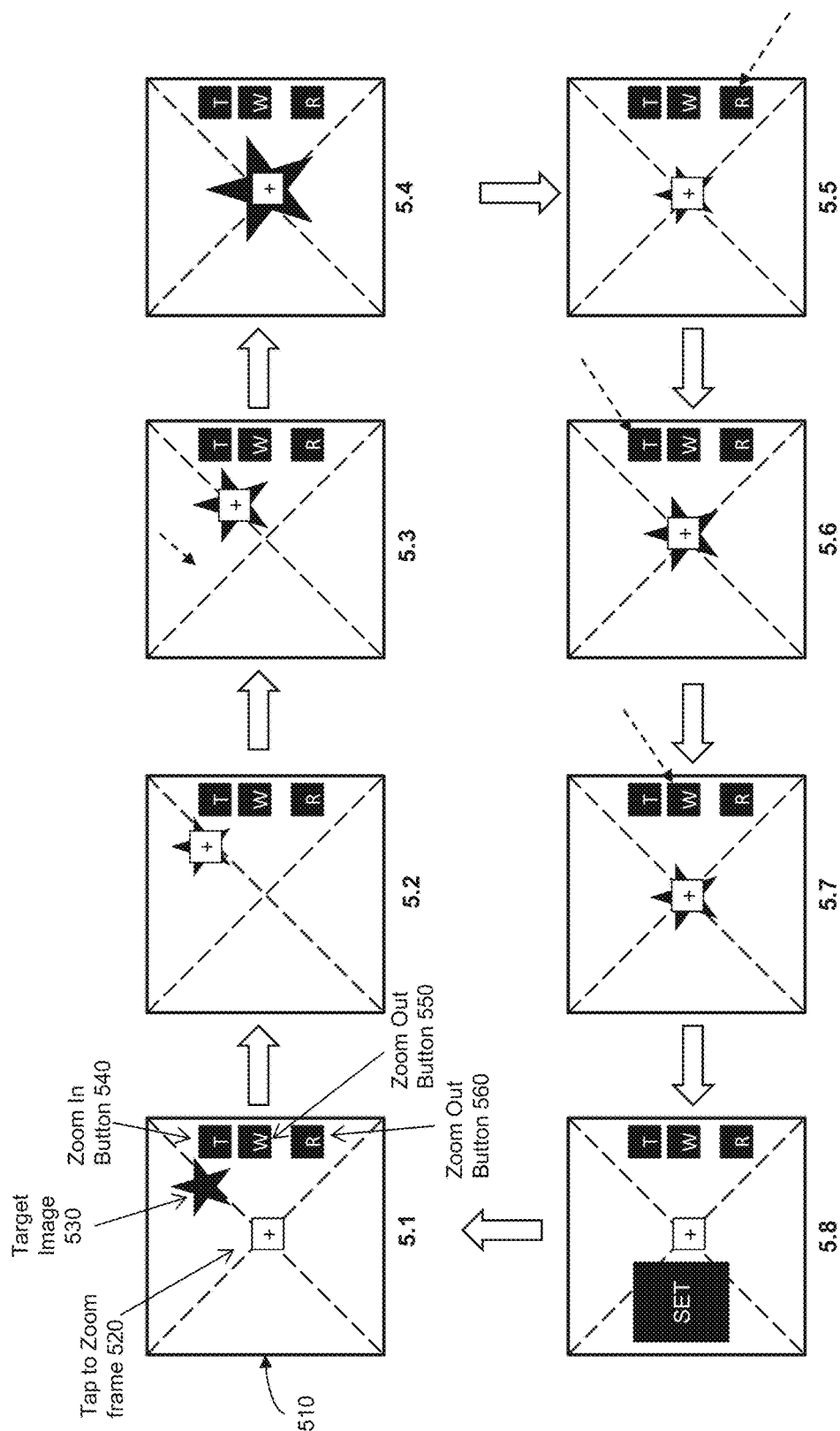
FIG. 5 illustrates examples for controlling a position and size of target shown on the display, in accordance with embodiments of the disclosure.

In some embodiments, user may be allowed to control a size of a target shown on the display and a position of the target shown on the display via the remote controller. A user may input a touch of a region of the display. The region of display may show a target. In some embodiments, based on the information about the user input indicative of the target, data may be generated to effectuate automatic control of a zoom level of the imaging device and an attitude of the imaging device relative to the target. In some embodiments, the user input may be a single user input indicative of adjusting a zoom level of an image shown on the display to a pre-set zoom level or by a predetermined zoom factor. Based on the single user input, instructions may be generated to effectuate an automatic adjustment of a zoom level of the imaging device, a distance of the imaging device form a target shown in the image or a combination of both, such that the imaging shown on the display is at the pre-set zoom level, or the zoom level of the image shown on the display is adjusted by the predetermined zoom factor. FIG. 5 illustrates examples for controlling a position and size of target shown on the display, in accordance with embodiments of the disclosure. As illustrated in 5.1, an image 510 captured by an imaging device carried by a movable object is displayed to a user via a display. The display may be comprised by a remote controller. A user may be allowed to select a target or region 530. The user may select a target or region through interaction with a touchscreen. For example, a user may select a target or region by performing a touch gesture onto the target or region shown on the screen. In some cases, a user may select a target or region to view by tapping on the target or the region. In some embodiments, the selected target is displayed with a selection indicator 520 in the images to indicate that is selected by the user. The selection indicator may be represented by a circle, checkmark, arrow, polygon, or any other suitably shaped object graphical object of any suitable color or pattern. In the depicted example, a user may select a target or region to view by drag and drop a selection indicator 520 to the interested target or region. For example, a user may want to take a closer look at the target 530 so the user may place the selection indicator 520 on top of the target. Alternatively, the selection indicator 520 may indicate a selected object to zoom in on. For example, after a user may tap on the target, the selection indicator 520 may be shown on top of the target indicating the target is selected to be zoomed in/out.

The display may further show one or more zoom controls for controlling the zoom level of the imaging device. In some embodiments, the one or more zoom controls comprise a zoom-in control configured to increase the zoom level of the imaging device and a zoom-out control configured to decrease the zoom level of the imaging device. In the exemplary embodiment illustrated in FIG. 5, a plurality of zoom controls may include a zoom-in control 540, zoom-out control 550 and a zoom reset control 560. A zoom-in control may be enabled by pressing on a zoom-in button 540 and a zoom-out control may be enabled by pressing on a zoom-out button 550. The zoom adjustment may be discrete/stepwise. For example, each tap on the zoom-in button causes the image size to be enlarged by a certain factor. Alternatively, the zoom adjustment may be continuous. For example, a long press on the button causes the image to be enlarged or zoomed in continuously until the button is released. Although the indicators indicating an input region are shown in the shape of a button in FIG. 5, any suitable shape, form, color of an indicator indicating an input region can be used. Alternatively, a user may be allowed to input a zoom level or perform a zoom control without an explicit indicator indicating an input region on the display. For instance, the user may perform pinching to zoom in or zoom out an image, or swiping to left or right to zoom in or zoom out an image.

In some embodiments, the one or more zoom controls may comprise a default zoom control for setting the zoom level of the imaging device to a pre-set zoom level or zoom factor. When a user provides an input using an input device such as a touchscreen, the image may be displayed at a pre-set zoom level. In some cases, the pre-set zoom level may be 1×. In some cases, the pre-set zoom level may be an original zoom level at which the imaging device starts capturing images. The pre-set zoom level is configurable by a user. The pre-set zoom level can be user defined. As illustrated in FIG. 5, a user may tap a reset button 560 to adjust the zoom level of the image shown on the display. Once the user taps on the reset button 560, the image may be displayed at the pre-set zoom level or magnification.

In some embodiments, a single user input indicative of adjusting a zoom level of an image shown on the display to a pre-set zoom level or by a predetermined zoom factor may be received. For instance, upon receiving a single user input indicative of adjusting a zoom level of an image (e.g., tapping on a reset zoom button), the image may be zoomed out (when the current zoom level is higher than the current zoom level) or zoomed in (when the current zoom level is lower than the pre-set zoom level) to a pre-set zoom level (e.g., 1×) regardless of the current zoom level of the image. For example, a current zoom level of an image is 3× and a predetermined zoom level is set as 1×, upon receiving a user input, the resulting zoom level of the image is 1×. In another instance, upon receiving a single user input indicative of adjusting a zoom level of an image, the image may be zoomed out or zoomed in by a predetermined zoom factor compared to the current zoom level of the image. For example, an image with current zoom level as 4× may be zoomed out by a predetermined zoom factor such as 2× resulting in a zoom level of 2×.

In some cases, the zoom level of the image is automatically adjusted to the pre-set zoom level or by a predetermined zoom factor at a speed. The speed for adjusting the zoom level may be the speed at which an image is perceived to be zoomed in/out by a zoom factor. The speed for adjusting the zoom level may depend on the speed at which the imaging device is capable of zooming. The speed may be an increased speed than performing the adjusting the location and zoom level sequentially. The speed of adjusting the image to a pre-set zoom level or by a predetermined zoom factor may be determined by the speed at which the imaging device is capable of zooming, the distance of the imaging device from the target is capable of changing, or a combination of both. For instance, when a predetermined zoom factor is 4×, it may take 1 second for the imaging device to adjust the zoom level by the predetermined zoom factor. In this case, the speed of adjusting the image by the predetermined zoom factor is 4×/s. In some cases, an image shown on the display is adjusted to be at a pre-set zoom level by controlling a zoom level of an imaging device (e.g., optical zoom or digital zoom). In some cases, an image shown on the display is adjusted to be at a pre-set zoom level by adjusting a distance of the imaging device from a target shown in the image. In some cases, an image shown on the display is adjusted to be at a pre-set zoom level by controlling both of the distance and the zoom level of the imaging device. In some cases, an increased perceived speed of zoom adjustment may be achieved by a combination of digital zoom and optical zoom. A perceived speed of zoom adjustment may refer to the speed of adjusting zoom level of an image shown on a display or the speed of adjusting a size of a target shown on a display. In some cases, digital zoom can be adjusted more quickly than optical zoom. So to increase the perceived speed of zoom adjustment, the digital zoom may be increased to a desired zoom level first, then decrease the digital zoom level while increasing the optical zoom level, until eventually the optical zoom is at the desired level, and digital zoom is back to none. Alternatively, the optical zoom may be increased to certain zoom level while the digital zoom is reduced to a zoom level such that the result of zoom level is a combination of optical zoom and digital zoom.

Similarly, a zoom level of the image shown on the display can be adjusted by a predetermined zoom factor by controlling a zoom level of the imaging device, a distance of the imaging device from the target shown in the image, or a combination of both. This is useful especially when a user zooms in on a target or a region on the display and finds out it is not what the user expects to see, this quick pre-set zoom option may allow the user to quickly zoom out to the original size or view of the image.

Control of the zoom levels can be performed at any time as needed by the user. It should be noted that the visual graphical element for the user to input the zoom controls can be of any shapes and forms. In some cases, the location of the visual graphical elements for zoom level control can be determined by the user. For example, a user may be allowed to place the zoom-in, zoom-out and reset zoom button to any location on the display screen according to a user's preference. In another example, once a user selects a target to zoom in/out, one or more visual graphical elements (e.g., zoom-in button, zoom-out button, reset button) for zoom control may be displayed around the selected target.

5.2-5.4 illustrates an exemplary process of adjusting a size of a target shown on a display and a position of the target shown on the display. As illustrated in the FIG. 5.1, a target is selected to be zoomed in and positioned to be displayed at a desired location (e.g., center). The process depicted in the FIG. 5.2 illustrates the selected target moving towards the desired location while zoomed in to a desired level or by a predetermined zoom factor. A result is depicted in 5.3 that the selected target is displayed at the desired location (e.g., center) with a desired size or at a desired zoom level. Once a user performs a touch gesture such as a tap on the target 530 or place the indicator 520 on the target, the target may be automatically enlarged while positioned to a predetermined location such as a center of the display as illustrated in 5.3 and 5.4. In some cases, a user may select a zoom level or zoom factor while selecting a target. For example, a user may perform a deep touch on the target, a menu shows up for the user to select a desired zoom level, and once the user releases the touch, the target may be automatically zoomed in/out to the desired zoom level while positioned at a desired location. In some cases, the target may be enlarged or magnified while it is moving towards the predetermined location. In some cases, the target may be enlarged to a predetermined size after it is positioned to the predetermined location. In other cases, the target may be enlarged to a predetermined size then positioned to the predetermined location. The speed at which for the target to be positioned to the predetermined location may be determined by the time takes for adjusting the attitude of the imaging device relative to the target and for adjusting a zoom of the imaging device. The predetermined size can be user defined. The predetermined size may be determined by the user through a menu. The menu may be provided on the display. The menu may be provided by a software or software application running on the remote controller. Various ways can be used for entering the desired zoom in/out level. For example, the user may select a zoom level (e.g., 2×, 4×) from a list or enter a zoom level into a textbox. The user may be permitted to select a predetermined magnification or zoom factor for adjusting the size of the target. In some cases, the predetermined size may be determined by an optimal size of the target. The optimal size may correspond to certain number of pixels or a predetermined threshold. The predetermined threshold may be defined, for example, as the size may fit the entire target within the display. For example, the movable object may be configured to move towards the target until a size of the target in the image reaches a predetermined threshold. Alternatively, the imaging device of the movable object may zoom in onto the target without the movable object moving, until a size of the target in the image reaches a predetermined threshold. Optionally the imaging device may zoom in and the movable object may move towards the target object simultaneously, until a size of the target in the image reaches a predetermined threshold.

While the target is shown to be moving towards a predetermined position and/or zooming to a desired/predetermined zoom level, the imaging device may continue transmitting live images to be displayed to the user. In this case, the user may observe movement of the target on the display caused by a relative movement between the imaging device and the target in the world frame. For example, when the imaging device is moving right relative to the target, the target is shown to be moving to the left on the display. In some cases, during the adjustment of the attitude of the imaging device relative to the target or the zoom level of the imaging device, images captured by the imaging device may not be displayed on the display whereas only the image captured after the adjustment process may be displayed to a user. Images illustrating a translational movement and zooming effect may be created by one or more processors and displayed to user to emulate a live movement of the target. In some cases, a smooth movement of the target from current location to a predetermined location or a size of the target enlarged from current size to a predetermined size may be created by the software or software application and displayed to the user. This may be advantageous in providing a smooth visual effect to a user.

In some cases, the location where the user touches the display screen may be used as the location of the target to calculate an offset from a predetermined location (e.g., center of the display). The offset is then used to calculate the adjustment to the UAV and/or imaging device necessary for bringing the target to the predetermined location. In some cases, a center of the target may be used to indicate a location of the target and the center of the target may be brought to be at or near the predetermined location. For example, a user input may be indicative of a target that the user is interested in whereas the touch location may not be aligned with a graphical center of the target. In this case, a shape and boundary of the target may be identified and the graphical center of the target may be brought to be aligned with or near the predetermined location (e.g., center of the display). Target identification can involve any suitable image recognition, extraction, pattern recognition and/or matching algorithms.

Figure 11:
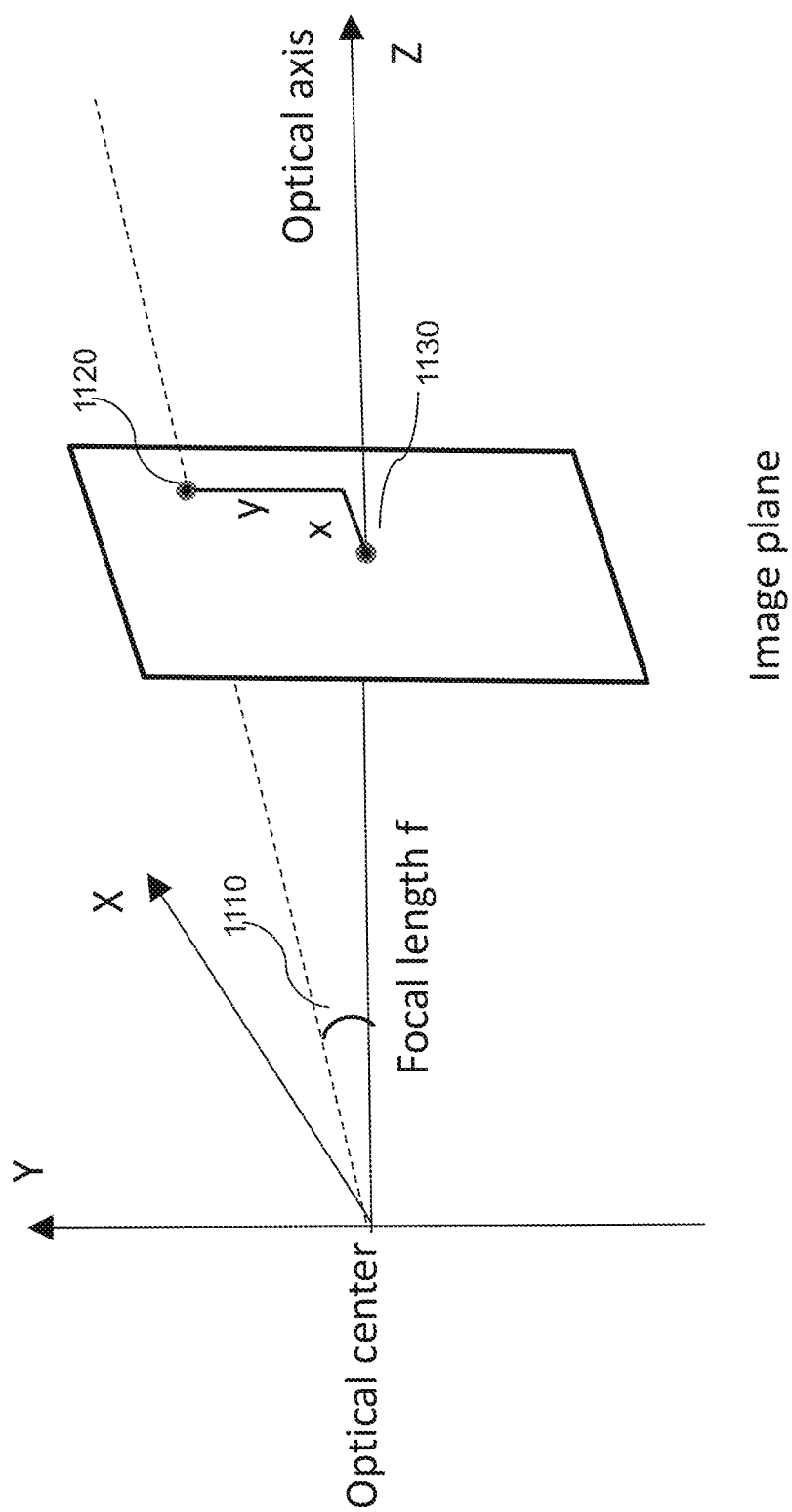
FIG. 11 illustrates an exemplary geometry model of camera imaging.

FIG. 11 illustrates an exemplary geometry model of camera imaging (assuming that the optical axis strictly aligns with the center of image). An offset of the target location from the desired location on the image plane is related to one or more rotational angles of the imaging device. The point 1120 denotes the location of a target selected by a user. The coordinate of the target in the image plane is (u, v). The coordinate of the target may be pixel coordinates and the origin (e.g., upper-left corner) of the image plane may not be the piecing point 1130 (i.e., intersection of the optical axis with the image plane), in which case pixel size and the origin location may be required for the calculation. The target may be configured to be displayed at a desired or predetermined location such as the piecing point. The offset of the target from the predetermined location is x and y in the x and y direction respectively. Once the coordinates of the target and the predetermined location as well as a focal length f are known, an angle 1110 can be determined using triangular geometry. For example, when the predetermined location is at the piecing point or center of the image plane, the offset of the target in the image plane may correspond to an angle 1110 determined by the equation below $$\theta x = \arctan\left(\frac{x}{f}\right)$$

$$\theta y = \arctan\left(\frac{y}{f}\right)$$

where f is the focal length, θx, θy are the rotation angles corresponding to the offset in the x and y direction respectively. The obtained angle may be used to control a rotational movement of the imaging device such that when the imaging device is rotated by the angle the target will be shown at the predetermined location of the image. It should be noted that the predetermined location needs not be at the center of the image plane. The angle may be used to control a rational movement of the imaging device about one, two, three or more rotational axes (e.g., roll axis, pitch axis, yaw axis).

As mentioned above, the zoom controls of the image can be performed at any time. For example, as shown in 5.5, after the target is positioned at the center and zoomed in to a predetermined size, a user may want to quickly zoom out the image to a pre-set zoom level (e.g., 1×) by tapping on the reset zoom button 560. The user can also adjust the zoom in and zoom out factor using the zoom-in and zoom-out button as described previously.

In some embodiments, selection of the zoom controls may cause adjustment to only the zoom level of the image shown on the display without changing a relative rotational relationship between the imaging device and the target. For instance, when a user uses the zoom-in or zoom-out control buttons, an image may be zoomed in/out and the center of the image stays at the center of the display. In some embodiments, the zoom control may be achieved by adjusting zoom level of the imaging device (e.g., optical zoom and/or digital zoom of the imaging device), a distance between the imaging device and the target, or a combination of both.

In some embodiments, a user may determine the variety of zoom factor or zoom levels. For example, a user may be allowed to define the default zoom-in level or size of the target in response to a user input indicative of the target as illustrated in 5.1-5.4. In another example, a user may select a stepwise zoom-in/out factor corresponding to a tap on the zoom-in/out button. In a further example, a user may select the pre-set zoom level when the reset zoom button is pressed. The display may show a menu through which a user selects the zoom factor.

As described above, the display may further show one or more zoom controls for controlling the zoom level of the imaging device. In the example as illustrated in 5.6, a user may increase the zoom level of the imaging device using a zoom-in button. As illustrated in 5.7, a user may decrease the zoom level of the imaging device using a zoom-out button. Various other ways of user input have been described elsewhere herein.

In some cases, the menu (as illustrated in 5.8) may be hidden from a user and visible to the user upon receiving a user touch gesture. For example, when the user inputs a gesture, such as a tap, onto any region on the touchscreen, the menu may switch from a hidden state to a view state. Various touch gestures may be used as the touch gesture for showing the menu, such as long press, double tap, deep touch, and the like. A deep touch may be a touch where the degree of pressure or force exceeds a threshold amount. A long touch may be a touch where the length of time exceeds a threshold amount. For instance, the menu may become visible when the user touches the display for a period of time for longer than a threshold length of time. In another instance, the menu may become visible when the user touches the display comprising a 3D touch screen with a pressure greater than a threshold pressure. In some instances, the pressure of a user touching the touchscreen may correlate with a zoom level. For example, greater pressure may correspond to higher zoon level. The touch gesture may or may not be required to be on a specific region on the display. In some embodiments, a user may be allowed to input a gesture on any region within the touchscreen to bring up the menu. The menu may show a plurality of options for the zoom factor to be selected. For instance, a series of zoom-in factors or magnifications may be provided to the user to be select as a pre-set zoom level corresponding to the reset zoom button, a default zoom level corresponding to the single user input indicative of a target, or the zoom-in/out steps corresponding to the zoom-in/out buttons.

The display may be a touchscreen. The display may be provided by a remote controller. The display may be provided by an external computing device (e.g., computer, laptop, tablet, smartphone, or other mobile device) that is operably coupled to the remote controller. The various operations as described above may be programmed and can be executed by one or more processors of the external computing device or one or more processors of the remote controller.

The systems and methods described herein can be implemented by and/or applied to a wide variety of movable objects. The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include primates, avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal). The terminal can be the same remote controller as described previously herein.

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the position of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 6:
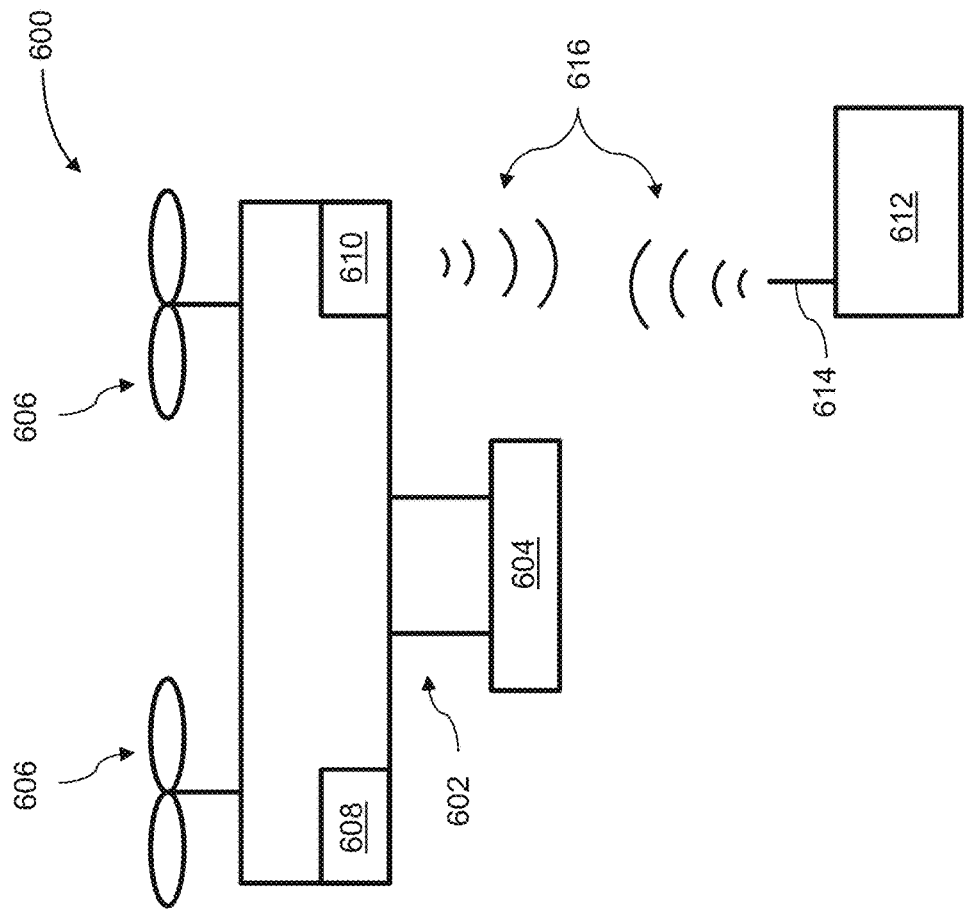
FIG. 6 illustrates a movable object including a carrier and a payload, in accordance with embodiments.

In some embodiments, the movable object that supports the imaging device may be a UAV. FIG. 6 illustrates a movable object 600 including a carrier 602 and a payload 604, in accordance with embodiments. Although the movable object 600 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 604 may be provided on the movable object 600 without requiring the carrier 602. The payload may include one or more imaging devices. The movable object 600 may include propulsion mechanisms 606, a sensing system 608, and a communication system 610.

The propulsion mechanisms 606 can include one or more of rotors, propellers, blades, engines, motors, wheels, axles, magnets, or nozzles, as previously described. For example, the propulsion mechanisms 606 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 606 can be mounted on the movable object 600 using any suitable means, such as a support element (e.g., a drive shaft) as described elsewhere herein. The propulsion mechanisms 606 can be mounted on any suitable portion of the movable object 600, such on the top, bottom, front, back, sides, or suitable combinations thereof.

In some embodiments, the propulsion mechanisms 606 can enable the movable object 600 to take off vertically from a surface or land vertically on a surface without requiring any horizontal movement of the movable object 600 (e.g., without traveling down a runway). Optionally, the propulsion mechanisms 606 can be operable to permit the movable object 600 to hover in the air at a specified position and/or orientation. One or more of the propulsion mechanism 600 may be controlled independently of the other propulsion mechanisms. Alternatively, the propulsion mechanisms 600 can be configured to be controlled simultaneously. For example, the movable object 600 can have multiple horizontally oriented rotors that can provide lift and/or thrust to the movable object. The multiple horizontally oriented rotors can be actuated to provide vertical takeoff, vertical landing, and hovering capabilities to the movable object 600. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 600 (e.g., with respect to up to three degrees of translation and up to three degrees of rotation).

The sensing system 608 can include one or more sensors that may sense the spatial disposition, velocity, and/or acceleration of the movable object 600 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 608 can be used to control the spatial disposition, velocity, and/or orientation of the movable object 600 (e.g., using a suitable processing unit and/or control unit, as described below). Alternatively, the sensing system 608 can be used to provide data regarding the environment surrounding the movable object, such as weather conditions, proximity to potential obstacles, location of geographical features, location of manmade structures, and the like.

The communication system 610 enables communication with terminal 612 having a communication system 614 via wireless signals 616. The communication systems 610, 614 may include any number of transmitters, receivers, and/or transceivers suitable for wireless communication. The communication may be one-way communication, such that data can be transmitted in only one direction. For example, one-way communication may involve only the movable object 600 transmitting data to the terminal 612, or vice-versa. The data may be transmitted from one or more transmitters of the communication system 610 to one or more receivers of the communication system 612, or vice-versa. Alternatively, the communication may be two-way communication, such that data can be transmitted in both directions between the movable object 600 and the terminal 612. The two-way communication can involve transmitting data from one or more transmitters of the communication system 610 to one or more receivers of the communication system 614, and vice-versa.

In some embodiments, the terminal 612 can provide control data to one or more of the movable object 600, carrier 602, and payload 604 and receive information from one or more of the movable object 600, carrier 602, and payload 604 (e.g., position and/or motion information of the movable object, carrier or payload; data sensed by the payload such as image data captured by a payload camera). The terminal can be the same as the remote controller as described previously. In some instances, control data from the terminal may include instructions for relative positions, movements, actuations, or controls of the movable object, carrier, and/or payload. For example, the control data may result in a modification of the location and/or orientation of the movable object (e.g., via control of the propulsion mechanisms 606), or a movement of the payload with respect to the movable object (e.g., via control of the carrier 602). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 608 or of the payload 604). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data provided transmitted by the terminal 612 can be configured to control a state of one or more of the movable object 600, carrier 602, or payload 604. Alternatively or in combination, the carrier 602 and payload 604 can also each include a communication unit configured to communicate with terminal 612, such that the terminal can communicate with and control each of the movable object 600, carrier 602, and payload 604 independently.

In some embodiments, the movable object 600 can be configured to communicate with another remote device in addition to the terminal 612, or instead of the terminal 612. The terminal 612 may also be configured to communicate with another remote device as well as the movable object 600. For example, the movable object 600 and/or terminal 612 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 600, receive data from the movable object 600, transmit data to the terminal 612, and/or receive data from the terminal 612. Optionally, the remote device can be connected to the Internet or other telecommunications network, such that data received from the movable object 600 and/or terminal 612 can be uploaded to a website or server.

Figure 7:
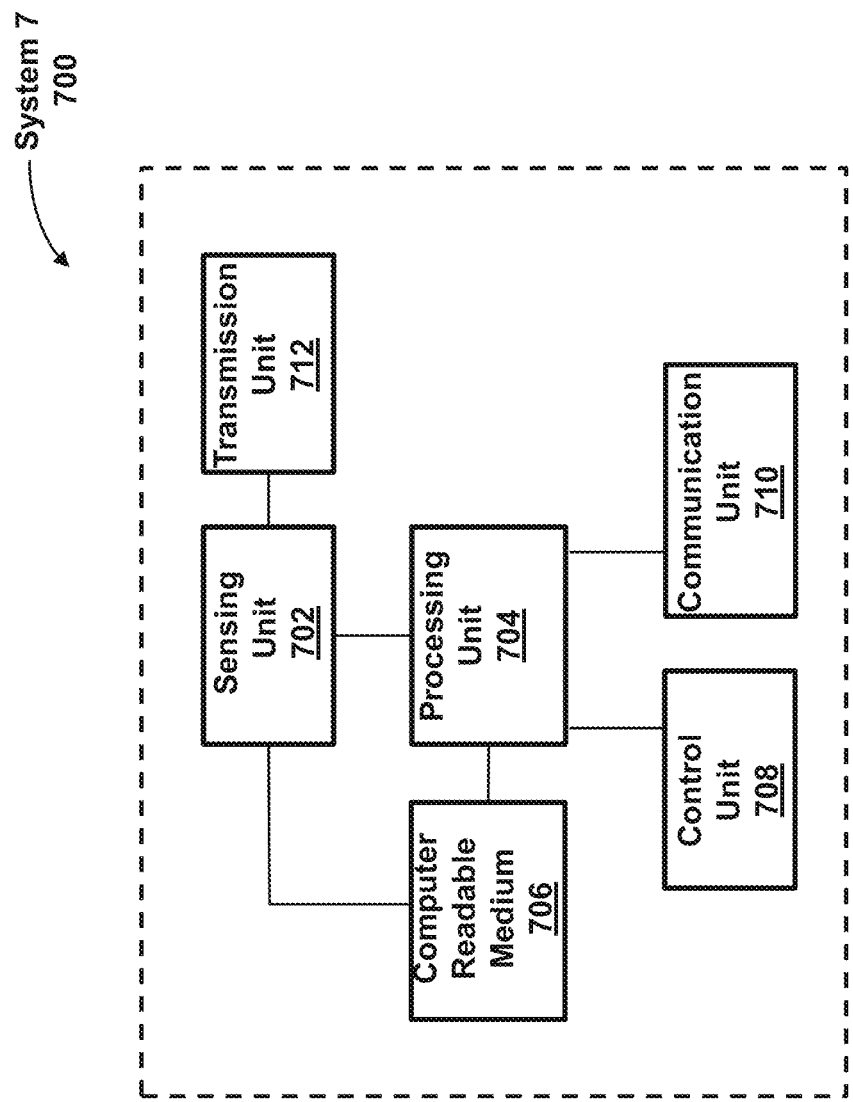
FIG. 7 illustrates an exemplary system for capturing image data, in accordance with embodiments.

FIG. 7 illustrates an exemplary system 700 for capturing image data, in accordance with embodiments. The system 700 can be used in combination with any suitable embodiment of the systems, devices, and methods disclosed herein. For example, the system 700 may be implemented or carried by a movable object. The system 700 can include a sensing unit 702, processing unit 704, non-transitory computer readable medium 706, control unit 708, and communication unit 710.

The sensing module 702 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 702 can be operatively coupled to a processing unit 704 having a plurality of processors. In some embodiments, the sensing module can be operatively coupled to a transmission unit 712 (e.g., a Wi-Fi image transmission unit) configured to directly transmit sensing data to a suitable external device or system. For example, the transmission unit 712 can be used to transmit images captured by a camera of the sensing unit 702 to a remote terminal.

The processing unit 704 can have one or more processors, such as a programmable processor (e.g., a central processing unit (CPU)). For example, the processing unit 704 may include a field programmable gate array (FPGA) and/or one or more ARM processors. The processing unit 704 can be operatively coupled to a non-transitory computer readable medium 706. The non-transitory computer readable medium 1606 can store logic, code, and/or program instructions executable by the processing unit 704 for performing one or more steps. The non-transitory computer readable medium can include one or more memory units (e.g., removable media or external storage such as an SD card or random access memory (RAM)). In some embodiments, data from the sensing unit 702 can be directly conveyed to and stored within the memory units of the non-transitory computer readable medium 706. The memory units of the non-transitory computer readable medium 706 can store logic, code and/or program instructions executable by the processing unit 704 to perform any suitable embodiment of the methods described herein. For example, the processing unit 704 can be configured to execute instructions causing one or more processors of the processing unit 704 to perform the image zoom control functionalities discussed herein. The memory units can store sensing data from the sensing unit to be processed by the processing unit 704. In some embodiments, the memory units of the non-transitory computer readable medium 706 can be used to store the processing results produced by the processing unit 704.

In some embodiments, the processing unit 704 can be operatively coupled to a control unit 708 configured to control a state of the movable object. For example, the control unit 708 can be configured to control the propulsion mechanisms of the movable object to adjust the spatial disposition, velocity, and/or acceleration of the movable object with respect to six degrees of freedom. Alternatively or in combination, the control unit 708 can control one or more of a state of a carrier, payload, or sensing unit.

The processing unit 704 can be operatively coupled to a communication unit 710 configured to transmit and/or receive data from one or more external devices (e.g., a terminal, display device, or other remote controller). Any suitable means of communication can be used, such as wired communication or wireless communication. For example, the communication unit 710 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication unit 710 can transmit and/or receive one or more of sensing data from the sensing unit 702, and/or processing results produced by the processing unit 704, predetermined control data or user commands from a terminal or remote controller, and the like.

The components of the system 700 can be arranged in any suitable configuration. For example, one or more of the components of the system 700 can be located on the movable object, carrier, payload, terminal, sensing system, or an additional external device in communication with one or more of the above. Additionally, although FIG. 7 depicts a single processing unit 704 and a single non-transitory computer readable medium 706, one of skill in the art would appreciate that this is not intended to be limiting, and that the system 700 can include a plurality of processing units and/or non-transitory computer readable media. In some embodiments, one or more of the plurality of processing units and/or non-transitory computer readable media can be situated at different locations, such as on the movable object, carrier, payload, terminal, sensing unit, additional external device in communication with one or more of the above, or suitable combinations thereof, such that any suitable aspect of the processing and/or memory functions performed by the system 700 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A control device, comprising:
   a touchscreen configured to:
      display an image captured by an imaging device supported by a movable object or a carrier coupled to the movable object; and
      receive a user input indicative of (1) selection of a position on the touchscreen to display a selected target of the image, and (2) selection of a zoom factor for zooming in or out of the selected target; and
   one or more processors configured to:
      generate control data based on information about the user input, the control data comprising instructions for the imaging device, the carrier, or the movable object to automatically control (1) an attitude of the imaging device for positioning the selected target at or near the selected position on the touchscreen, and (2) a zoom level of the imaging device according to the user selected zoom factor.

2. The control device of claim 1, wherein the user input comprises a deep touch or a long touch on the touchscreen, and the zoom factor is determined based on a degree of pressure or a period of time applied to the touchscreen.

3. The control device of claim 1, wherein the user input comprises a multi-point touch on the touchscreen, and the zoom factor is determined based on a distance between touch points of the multi-point touch on the touchscreen.

4. The control device of claim 1, wherein the one or more processors are further configured to:
   determine a zooming speed for automatically controlling the zoom level based on at least one of:
      a movement of the movable object relative to the selected target, or
      an adjusting speed of the zoom level of the imaging device.

5. The control device of claim 1, wherein the touchscreen is further configured to display a menu which allows user selection of a predetermined zoom factor by which the zoom level of the imaging device is automatically adjusted.

6. The control device of claim 1, wherein the touchscreen is further configured to display one or more zoom controls for controlling the zoom level of the imaging device, and the one or more zoom controls comprise a default zoom control for setting the zoom level of the imaging device to a pre-set zoom level configurable by a user.

7. The control device of claim 1, wherein the touchscreen is further configured to display one or more zoom controls for controlling the zoom level of the imaging device, and the one or more zoom controls comprise at least one of:
   a zoom-in control configured to increase the zoom level of the imaging device; or
   a zoom-out control configured to decrease the zoom level of the imaging device.

8. The control device of claim 1, wherein the touchscreen is further configured to display one or more zoom controls for controlling the zoom level of the imaging device, and the one or more zoom controls are configured to be switched from a hidden state to a view state in response to the user input being received by the touchscreen.

9. The control device of claim 1, further comprising:
   a communication unit configured to communicate with at least one of the imaging device, the carrier, or the movable object.

10. The control device of claim 1, wherein the movable object is an unmanned aerial vehicle (UAV).

11. A method, comprising:
    displaying, on a touchscreen, an image captured by an imaging device supported by a movable object or a carrier coupled to the movable object;
    receiving, via the touchscreen, a user input indicative of (1) selection of a position on the touchscreen to display a selected target of the image, and (2) selection of a zoom factor for zooming in or out of the selected target; and generating control data based on information about the user input, the control data comprising instructions for the imaging device, the carrier, or the movable object to automatically control (1) an attitude of the imaging device for positioning the selected target at or near the selected position on the touchscreen, and (2) a zoom level of the imaging device according to the user selected zoom factor.

12. The method of claim 11, wherein the user input is a first user input and the method further comprises:

receiving a second user input indicative of selection of the selected target within the image before receiving the first user input.

13. The method of claim 11, wherein the user input includes a touch of a region of the touchscreen that displays the selected target.

14. The method of claim 11, wherein the information about the user input comprises an offset from a current position of the selected target to the selected position on the touchscreen.

15. The method of claim 11, further comprising:

determining a zooming speed for automatically controlling the zoom level based on at least one of:
   a movement of the movable object relative to the selected target, or
   an adjusting speed of the zoom level of the imaging device.

16. The method of claim 11, wherein the control data to automatically control the attitude and the zoom level further comprises a predetermined zoom factor by which the zoom level of the imaging device is automatically adjusted, to be transmitted to at least one of the imaging device, the carrier, or the movable object.

17. The method of claim 11, wherein the zoom level of the imaging device is further automatically controlled by adjusting the zoom level of the imaging device by a predetermined zoom factor.

18. The method of claim 11, wherein the attitude of the imaging device is automatically controlled by adjusting at least one of:

an attitude of the imaging device relative to the movable object with or without aid of the carrier, or an attitude of the movable object relative to the selected target.

19. The method of claim 11, wherein the control data is configured to automatically control the attitude and the zoom level substantially concurrently.

20. A non-transitory computer readable medium comprising program instructions executable by one or more processors for capturing an image, the program instructions comprising:

displaying, on a touchscreen, an image captured by an imaging device supported by a movable object or a carrier coupled to the movable object;

receiving, via the touchscreen, a user input indicative of (1) selection of a position on the touchscreen to display a selected target of the image, and (2) selection of a zoom factor for zooming in or out of the selected target; and generating control data based on information about the user input, the control data comprising instructions for the imaging device, the carrier, or the movable object to automatically control (1) an attitude of the imaging device for positioning the selected target at or near the selected position on the touchscreen, and (2) a zoom level of the imaging device according to the user selected zoom factor.

\* \* \* \* \*